United States Patent [19]
Fukasawa

[11] Patent Number: 6,111,984
[45] Date of Patent: Aug. 29, 2000

[54] METHOD FOR MATCHING INPUT IMAGE WITH REFERENCE IMAGE, APPARATUS FOR THE SAME, AND STORAGE MEDIUM STORING PROGRAM FOR IMPLEMENTING THE METHOD

[75] Inventor: Yoshio Fukasawa, Kawasaki, Japan

[73] Assignee: Fujitsu Limited, Kawasaki, Japan

[21] Appl. No.: 09/009,936

[22] Filed: Jan. 21, 1998

[30] Foreign Application Priority Data

Jun. 10, 1997 [JP] Japan ................................... 9-152449

[51] Int. Cl.⁷ ................................. G06K 9/62; G06K 9/46
[52] U.S. Cl. ......................... 382/209; 382/194; 382/195
[58] Field of Search ................................... 382/175, 205, 382/209, 216, 217, 218, 289, 219, 220, 221, 194, 195

[56] References Cited

U.S. PATENT DOCUMENTS

| | | | |
|---|---|---|---|
| 4,633,507 | 12/1986 | Cannistra et al. | 382/61 |
| 4,975,974 | 12/1990 | Nishijima et al. | 382/34 |
| 5,054,098 | 10/1991 | Lee | 382/46 |
| 5,228,100 | 7/1993 | Takeda et al. | 382/61 |
| 5,280,530 | 1/1994 | Trew et al. | 382/1 |
| 5,586,202 | 12/1996 | Ohki et al. | 382/236 |
| 5,617,481 | 4/1997 | Nakamura | 382/175 |
| 5,701,369 | 12/1997 | Moon et al. | 382/249 |
| 5,703,963 | 12/1997 | Kojima et al. | 382/264 |
| 5,748,809 | 5/1998 | Hirsch | 382/175 |
| 5,764,798 | 6/1998 | Liu | 382/190 |
| 5,838,820 | 11/1998 | Bergman | 382/187 |
| 5,930,391 | 7/1999 | Kinjo | 382/173 |

FOREIGN PATENT DOCUMENTS

| | | |
|---|---|---|
| 7-249099 | 9/1995 | Japan . |
| 7-282193 | 10/1995 | Japan . |
| 8-077294 | 3/1996 | Japan . |

*Primary Examiner*—Martin Miller
*Attorney, Agent, or Firm*—Staas & Halsey LLP

[57] ABSTRACT

Matching between a reference image and an input image is performed without relying on specific elements such as line segments or tables. An edge image is generated from the reference image and divided into small blocks, and search range and search priority of each small block are determined and stored in a storage device. When an input image is input, an edge image thereof is generated. The small blocks in the reference image are retrieved in order of priority, and matching with the input image is judged. When the corresponding position of one small block is determined, the search range and search priority for other small blocks not yet judged for matching are updated on the basis of the determined corresponding position.

33 Claims, 30 Drawing Sheets

SMALL-BLOCK WIDTH

REFERENCE SIDE
INPUT SIDE

REFERENCE SIDE
INPUT SIDE

REFERENCE SIDE
INPUT SIDE

Fig.45
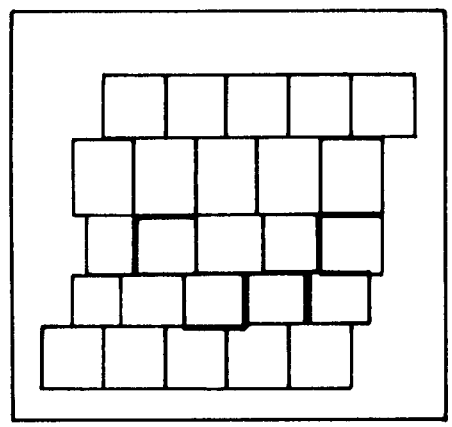
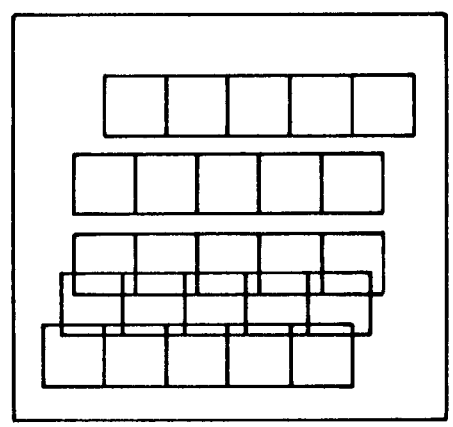
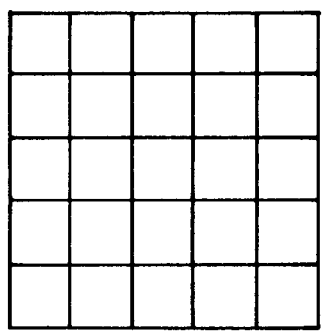

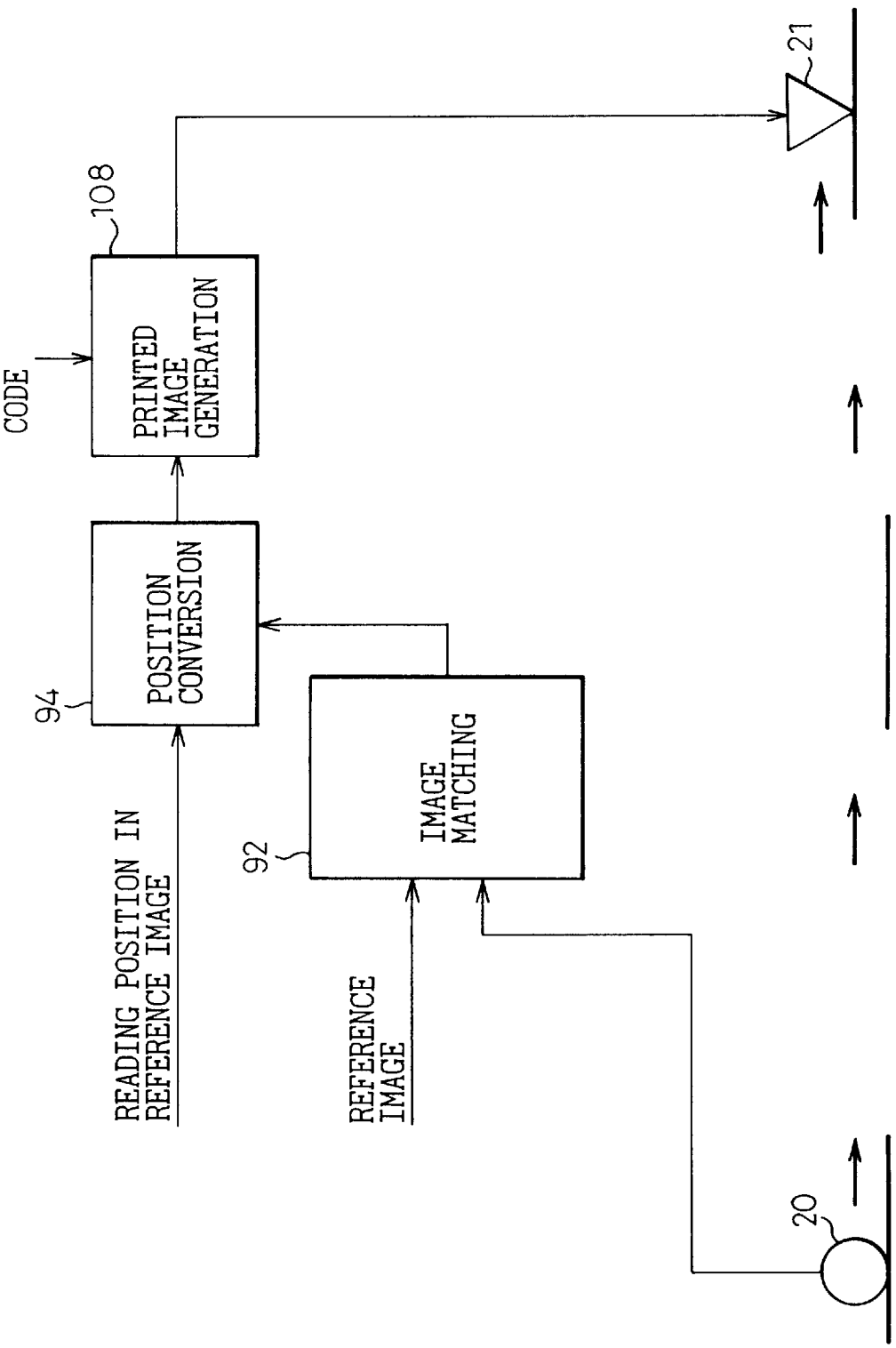

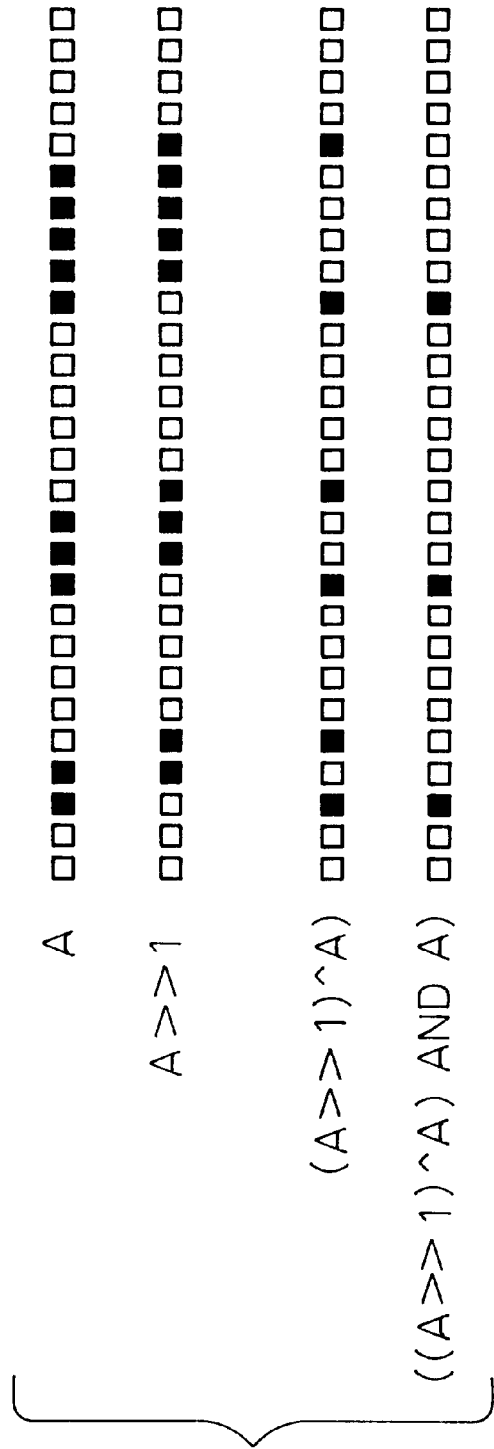

METHOD FOR MATCHING INPUT IMAGE WITH REFERENCE IMAGE, APPARATUS FOR THE SAME, AND STORAGE MEDIUM STORING PROGRAM FOR IMPLEMENTING THE METHOD

BACKGROUND OF THE INVENTION

1. Field of the Invention

The present invention relates to a method of matching an input image with a reference image, the input image possibly containing an addition or deletion to the reference image and possibly having been subjected to transformations such as positional displacement, stretching/shrinking, and skewing relative to the reference image; a character recognition method, a mismatching portion detection method, and a printing method using the above matching method; an apparatus for implementing these methods; and a storage medium storing programs for implementing these methods.

2. Description of the Related Art

In an optical character reading apparatus (OCR apparatus) designed to read handwritten characters, it is practiced to measure in advance the coordinates of reading regions on a printed form by using a ruler or the like and to store the result as a form descriptor. When a filled-out form is input, character recognition is performed by clipping the same regions by referring to the descriptor. This method requires that the amount of printing misregistration of the form be extremely small, and that the amount of image skew and displacement when the form is input into an image scanner is zero or measurable. Otherwise, characters in the correct positions cannot be read. For this purpose, it is practiced (1) to eliminate the effects of printing misregistration and sheet cutting errors by strictly controlling the printing and cutting accuracies of the form paper and (2) to eliminate skew, image stretching/shrinking, and unsteady feed of the paper by enhancing the transport accuracy of the scanner into which the paper is fed. These necessarily lead to various constraints, imposing limitations on the form design and increasing system cost.

In recent years, there has been a strong need to relax these constraints, and one method of solving this problem has been aligning positions using preprinting such as marks and frame lines preprinted on the form sheet.

In the mark preprinting method, registration marks such as cross-shaped or L-shaped marks are preprinted in the corners of the form sheet in the case of an OCR, for example, and registration is achieved by detecting the marks from the input image. With this method, however, existing forms cannot be used but need to be redesigned to the mark specification, which increases the cost and requires time and labor to correct the form. Furthermore, while positional precision is high near the marks, the precision decreases in regions located farther away from the marks. This is because the transformation parameters (displacement, rotation, and stretching/shrinking) of the input image are not uniform but vary within the image. If the precision is to be enhanced, the number of marks has to be increased, but this is often not allowable for layout reasons.

In view of these problems, there have recently been devised methods which perform matching by relying on elements originally existing in the image, for example, the line segments of a table printed on the form sheet (refer, for example, to Japanese Unexamined Patent Publication Nos. 7-249099, 7-282193, and 8-77294). Matching the lines on the form sheet one by one works well for image distortions, since it has the same effect as increasing the number of marks in the first described method.

These methods, however, have the disadvantage that because of their principle of operation, they can only process printed forms composed of lines. For example, some questionnaire forms require filling in characters in parentheses within printed text or entering date before the printed characters of "Year", "Month", and "Day". The above methods cannot be applied to such questionnaire forms. Since printed forms and slips of the types that require entering a character, for example, within a circle, and that does not use lines are widespread, the methods that perform matching by relying on line segments cannot handle many of the forms currently used.

In view of the above situation, for an image composed of arbitrary graphic elements or characters, not limited only to lines, if an input image, containing an addition/deletion to a reference image and subjected to transformations such as positional displacement, stretching/shrinking, and skewing, can be matched with various portions of the reference image, characters written on a form sheet with no lines or only a limited number of lines printed thereon can be read in the presence of transformations such as positional displacement, stretching/shrinking, and skewing.

SUMMARY OF THE INVENTION

It is accordingly an object of the present invention to provide a method of matching an input image with a reference image for an image composed of arbitrary graphic elements and/or characters, not limited only to lines, the input image possibly containing an addition or deletion to the reference image and possibly having been subjected in its entirety to transformations such as positional displacement, stretching/shrinking, and skewing relative to the reference image, and also provide an apparatus for implement the same method.

It is another object of the present invention to provide a character recognition method, a mismatching portion detection method, and a printing method using the above matching method, and an apparatus for implementing these methods.

It is still another object of the present invention to provide a storage medium storing programs for implementing the above methods.

According to the present invention, there is provided a method for matching an input image with a reference image by determining the positions of various portions in the input image corresponding to various portions of the reference image, comprising the steps of: dividing in advance the reference image into a plurality of small blocks; determining for each small block a range over which to search for a portion corresponding thereto in the input image; storing the reference image divided into small blocks together with the search range for each small block; and searching the input image within the search range for an image corresponding to the reference image divided into small blocks, and determining the position in the input image of the image corresponding to the reference image divided into small blocks.

Preferably, the searching step includes the substeps of: generating in advance a reference edge image by extracting an edge of the reference image; generating an input edge image by extracting an edge of the input image; calculating the frequency of a distance between each of the pixels forming the edge of the input edge image and each of the pixels forming the edge of the reference edge image when the reference edge image is superimposed at an estimated corresponding position of the input edge image; and determining the corresponding position by determining the distance whose calculated frequency exceeds a prescribed threshold as representing the distance between the input image and the reference image.

According to the present invention, there is also provided a method for recognizing filled-in characters from an input image generated from a form sheet filled out with characters, comprising the steps of: dividing in advance a reference image generated from a blank form sheet into a plurality of small blocks; determining for each small block a range over which to search for a portion corresponding thereto in the input image; storing the reference image divided into small blocks together with the search range for each small block; searching the input image within the search range for an image corresponding to the reference image divided into small blocks, and determining the position in the input image of the image corresponding to the reference image divided into small blocks: determining a character entry region in the input image corresponding to a prestored entry region on the basis of the thus determined corresponding position; and recognizing a character from an image within the thus determined character entry region in the input image.

According to the present invention, there is also provided a method, for recognizing filled-in characters from an input image generated from a form sheet filled out with characters, comprising the steps of: dividing in advance a reference image generated from a blank form sheet into a plurality of small blocks; determining for each small block a range over which to search for a portion corresponding thereto in the input image; storing the reference image divided into small blocks together with the search range for each small block; searching the input image within the search range for an image corresponding to the reference image divided into small blocks, and determining the position in the input image of the image corresponding to the reference image divided into small blocks: stripping the input image of portions corresponding to the reference image on the basis of the corresponding position determined for each small block; and recognizing characters from the input image stripped of the reference image.

According to the present invention, there is also provided a method for detecting a mismatching portion between a first image and a second image, comprising the steps of: dividing in advance the first image into a plurality of small blocks; determining for each small block a range over which to search for a portion corresponding thereto in the second image; storing the first image divided into small blocks together with the search range for each small block; searching the second image within the search range for an image corresponding to the first image divided into small blocks, and determining the position in the second image of the image corresponding to the first image divided into small blocks: stripping the second image of portions corresponding to the first image on the basis of the corresponding position determined for each small block; grouping pixels remaining in the second image stripped of the first image; and determining a pixel group as representing a mismatching portion if the number of pixels arranged as belonging to the group exceeds a prescribed value.

According to the present invention, there is also provided a method for printing characters on a form sheet, comprising the steps of: dividing in advance a reference image generated from a reference form sheet into a plurality of small blocks; determining for each small block a range over which to search for a portion corresponding thereto in an input image generated from a form sheet to be printed with characters; storing the reference image divided into small blocks together with the search range for each small block; searching the input image within the search range for an image corresponding to the reference image divided into small blocks, and determining the position in the input image of the image corresponding to the reference image divided into small blocks: determining a printing position in the input image corresponding to a prestored printing position on the basis of the thus determined corresponding position; and printing characters on the form sheet to be printed with characters, in accordance with the thus determined printing position.

According to the present invention, there is also provided an apparatus for matching an input image with a reference image by determining the positions of various portions in the input image corresponding to various portions of the reference image, comprising: search range determining means for determining, for each of a plurality of small blocks into which the reference image is divided, a range over which to search for a portion corresponding thereto in the input image; storage means for storing the reference image divided into small blocks together with the search range for each small block; and searching means for searching the input image within the search range for an image corresponding to the reference image divided into small blocks, and for determining the position in the input image of the image corresponding to the reference image divided into small blocks.

Preferably, the searching means includes: reference edge image generating means for generating in advance a reference edge image by extracting an edge of the reference image; input edge image generating means for generating an input edge image by extracting an edge of the input image; frequency calculating means for calculating the frequency of a distance between each of the pixels forming the edge of the input edge image and each of the pixels forming the edge of the reference edge image when the reference edge image is superimposed at an estimated corresponding position of the input edge image; and distance determining means for determining the corresponding position by determining the distance whose calculated frequency exceeds a prescribed threshold as representing the distance between the input image and the reference image.

According to the present invention, there is also provided an apparatus for recognizing filled-in characters from an input image generated from a form sheet filled out with characters, comprising: dividing means for dividing in advance a reference image generated from a blank form sheet into a plurality of small blocks; search range determining means for determining for each small block a range over which to search for a portion corresponding thereto in the input image; storage means for storing the reference image divided into small blocks together with the search range for each small block; searching means for searching the input image within the search range for an image corresponding to the reference image divided into small blocks, and for determining the position in the input image of the image corresponding to the reference image divided into small blocks: entry region determining means for determining a character entry region in the input image corresponding to a prestored entry region on the basis of the corresponding position determined by the searching means; and means for recognizing a character from an image within the character entry region determined by the entry region determining means in the input image.

According to the present invention, there is also provided an apparatus for recognizing filled-in characters from an input image generated from a form sheet filled out with characters, comprising: dividing means for dividing in advance a reference image generated from a blank form sheet into a plurality of small blocks; search range determining means for determining for each small block a range over which to search for a portion corresponding thereto in the input image; storage means for storing the reference image divided into small blocks together with the search range for each small block; searching means for searching the input image within the search range for an image corresponding to the reference image divided into small blocks, and for determining the position in the input image of the image corresponding to the reference image divided into small blocks: means for stripping the input image of portions corresponding to the reference image on the basis of the corresponding position determined for each small block; and means for recognizing characters from the input image that has been stripped of the reference image.

According to the present invention, there is also provided an apparatus for detecting a mismatching portion between a first image and a second image, comprising: search range determining means for determining in advance, for each of a plurality of small blocks into which the first image is divided, a range over which to search for a portion corresponding thereto in the second image; storage means for storing the first image divided into small blocks together with the search range for each small block; searching means for searching the second image within the search range for an image corresponding to the first image divided into small blocks, and for determining the position in the second image of the image corresponding to the first image divided into small blocks: means for stripping the second image of portions corresponding to the first image on the basis of the corresponding position determined for each small block; means for grouping pixels remaining in the second image that has been stripped of the first image; and means for determining a pixel group as representing a mismatching portion if the number of pixels arranged as belonging to the group exceeds a prescribed value.

According to the present invention, there is also provided an apparatus for printing characters on a form sheet, comprising: dividing means for dividing in advance a reference image generated from a reference form sheet into a plurality of small blocks; search range determining means for determining for each small block a range over which to search for a portion corresponding thereto in an input image generated from a form sheet to be printed with characters; storage means for storing the reference image divided into small blocks together with the search range for each small block; searching means for searching the input image within the search range for an image corresponding to the reference image divided into small blocks, and for determining the position in the input image of the image corresponding to the reference image divided into small blocks: printing position determining means for determining a printing position in the input image corresponding to a prestored printing position on the basis of the corresponding position determined by searching means; and means for printing characters on the form sheet to be printed with characters, in accordance with the printing position determined by the printing position determining means.

According to the present invention, there is also provided a computer-readable storage device storing a program for implementing each of the above methods when connected to a computer.

BRIEF DESCRIPTION OF THE DRAWINGS

FIG. 45 is a diagram for explaining the operation of the apparatus of FIG. 44;

FIG. 47 is a functional block diagram of a printing apparatus according to a further embodiment of the present invention; and FIG. 48 is a diagram for explaining a method of edge image generation.

DESCRIPTION OF THE PREFERRED EMBODIMENTS

In matching an input image with a reference image, the present invention employs a method in which an image of a blank form sheet is stored in advance as a reference image, and an input image is compared with the reference image for matching so that the matching can be performed without relying on specific elements such as line segments and tables. More specifically, the reference image, or a reference edge image created by extracting from the reference image only those regions where the lightness changes, is divided into blocks of small regions which are then stored. When an image is input for matching, the input image or an input edge image created from it are searched for regions that match blocks of the reference image or the reference edge image, starting with those blocks stored that can be easily matched. When a matching region is found, the range of search for regions that match other blocks is narrowed based on the matching region. This process is repeated to accomplish image matching.

Figure 1:
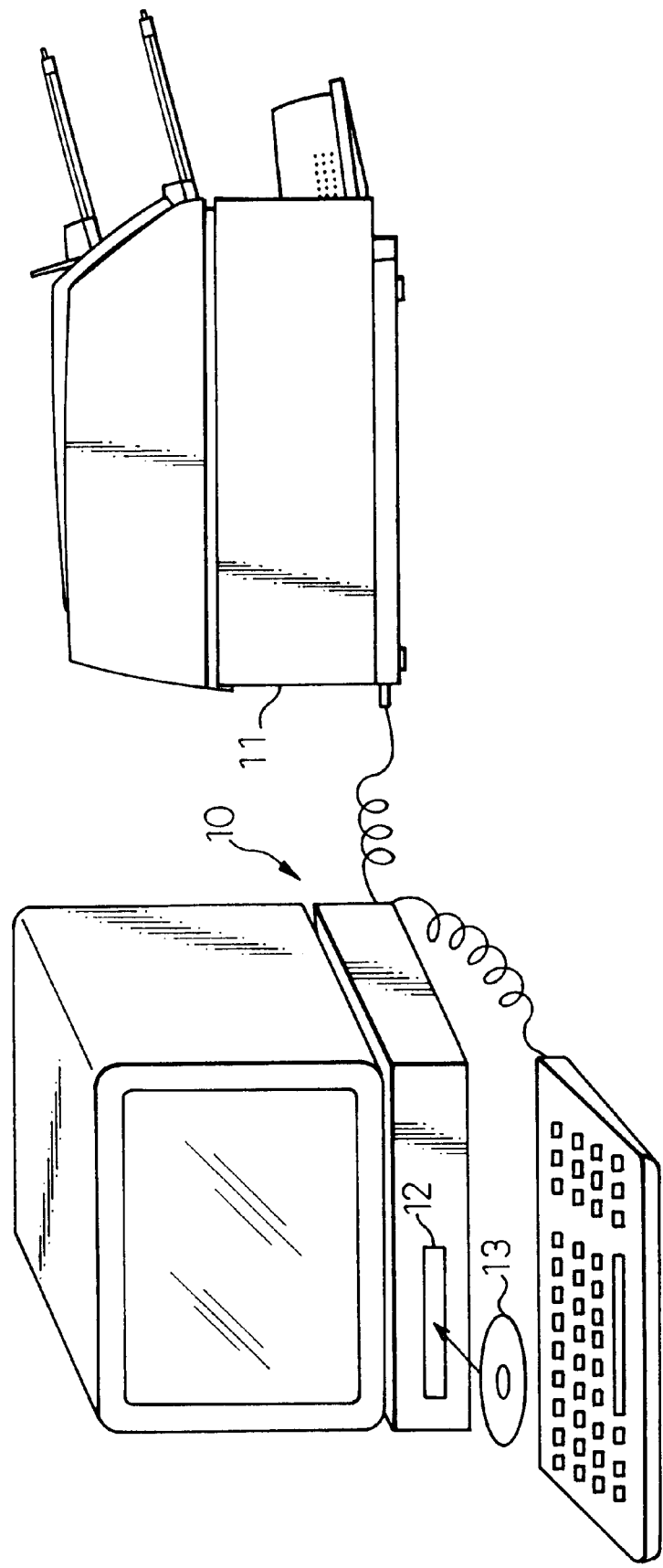
FIG. 1 is a diagram showing the hardware a configuration of an apparatus according to the present invention.

FIG. 1 shows the hardware configuration of an apparatus according to an embodiment of the present invention. In FIG. 1, a reading apparatus 11 for reading a form sheet, such as a printed form or a questionnaire sheet, is connected to a personal computer 10. The personal computer 10 is equipped with a CD-ROM drive 12 and has a built-in line modem. The program for implementing the method according to the embodiment of the present invention may be stored on the personal computer's hard disk, or may be stored on a CD-ROM 13 which is inserted in the CD-ROM drive 12 when necessary so that the program stored on the CD-ROM 13 is loaded into an internal memory of the personal computer 10, or may be loaded into the internal memory of the personal computer 10 when necessary from a data base connected to the line via the line modem. The method and apparatus of the present invention can thus be implemented.

Figure 2:
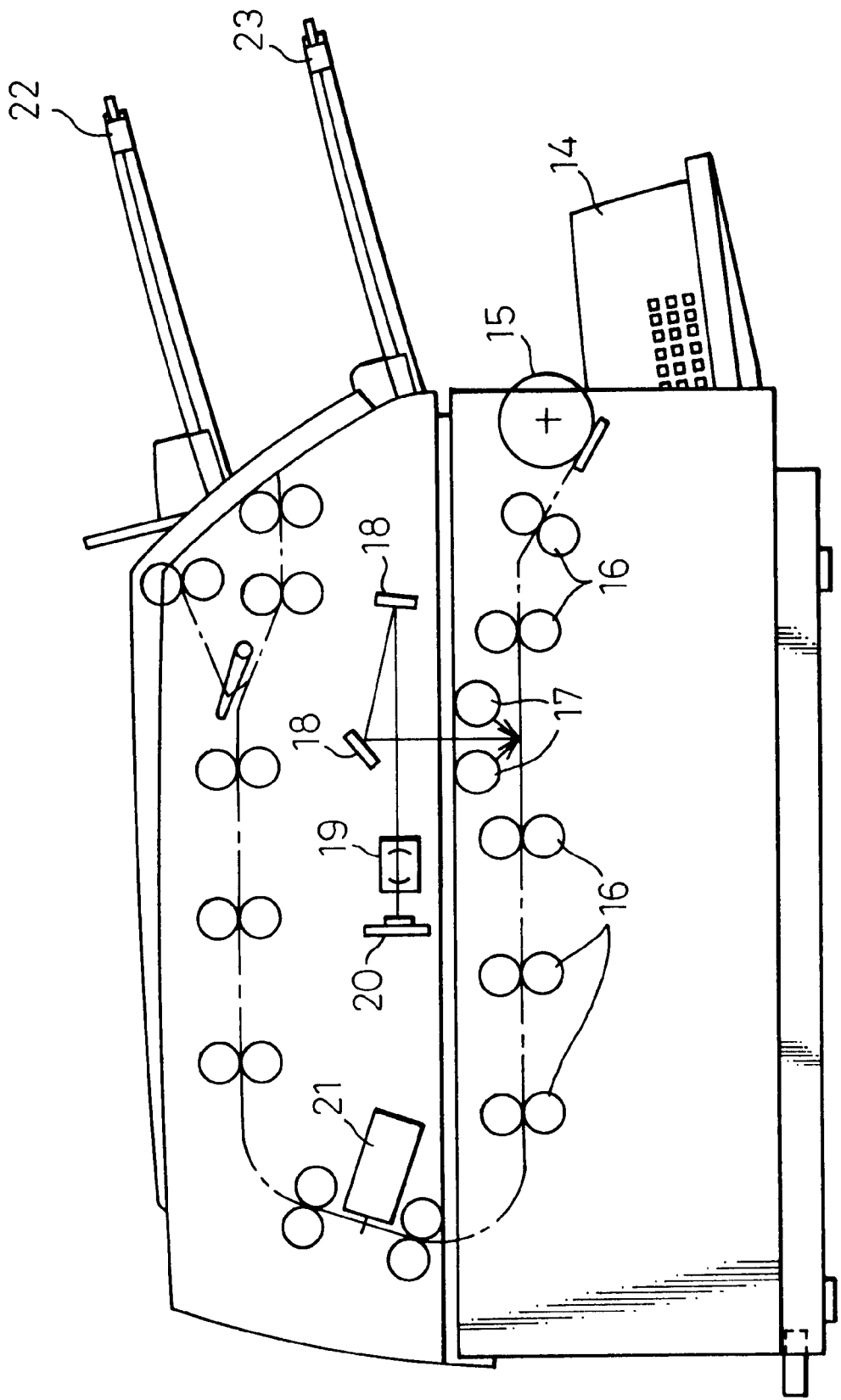
FIG. 2 is a diagram showing the internal construction of a reading apparatus of FIG. 1.

FIG. 2 shows the details of the internal construction of the reading apparatus 11. In FIG. 2, form sheets stacked on a hopper 14 are picked up one sheet at a time by a pickup roller 15 from the top of the stack, and transported by transport rollers 16 along the semi-dashed line shown in FIG. 2. The hopper 14 moves up and down according to the height of the stacked sheets. Light from a light source 17 illuminates the sheet being transported, and its reflected light is reflected by reflecting mirrors 18 and enters a one-dimensional CCD device 20 through a lens 19. In this way, an image of the form sheet can be obtained in electrical signal form. The image signal obtained by the CCD device 20 is input to the personal computer 10 via an image interface (not shown). A printing unit 21 prints desired characters on the sheet being transported, in accordance with a command from the personal computer 10. The form sheet, whose image has been read and on which the characters have been printed, is transported to a stacker 22 or 23 for stacking thereon. If character recognition shows a faulty result, the sheet is transported to either the stacker 22 or 23 for stacking separately from normally recognized sheets, under instruction from the personal computer 10.

Figure 3:
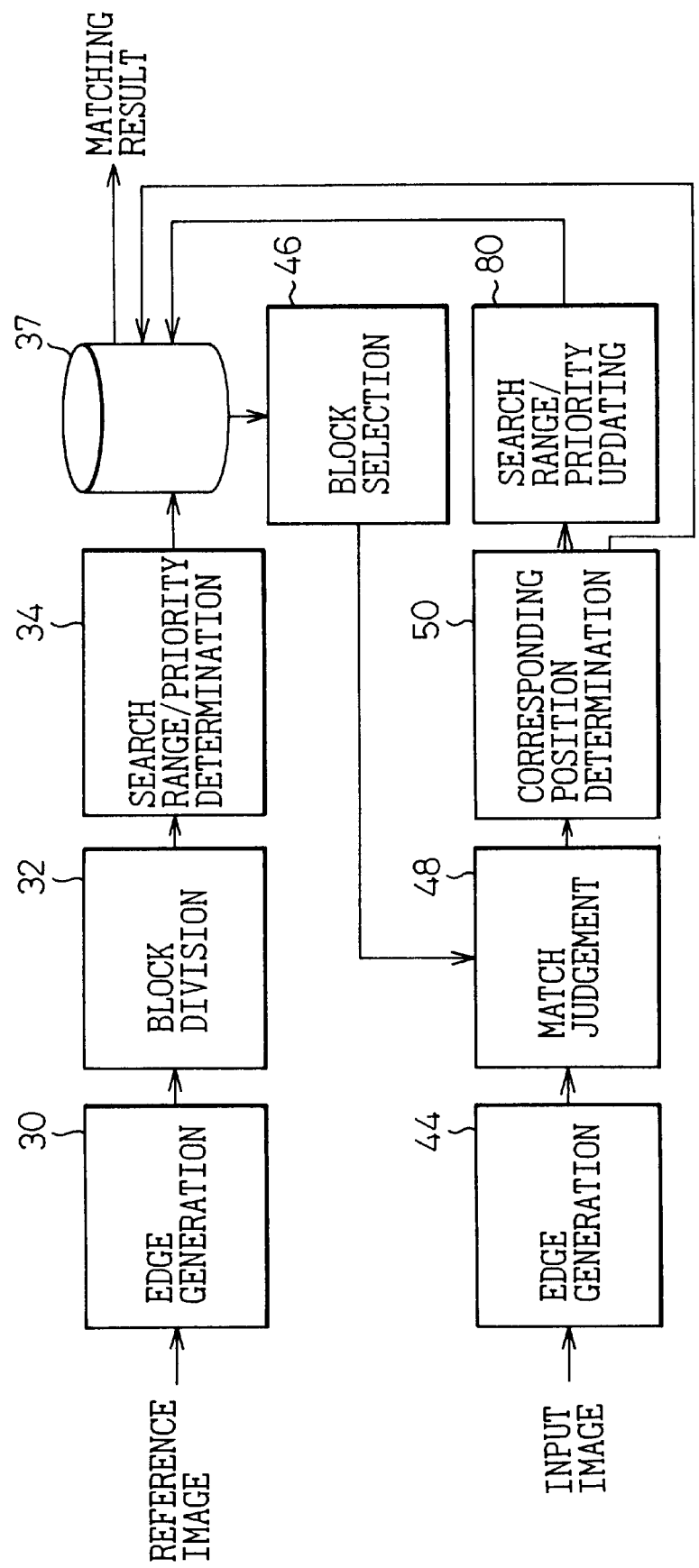
FIG. 3 is a functional block diagram of an image matching apparatus according to one embodiment of the present invention.
Figure 4:
FIG. 4 is a diagram showing a portion of a reference image as a binary image.

FIG. 3 is a functional block diagram of an image matching apparatus according to one embodiment of the present invention, which is implemented in collaboration with the personal computer 10 of FIG. 1 and the software program stored on the CD-ROM 13. In FIG. 3, an edge generator 30 generates an upper/lower edge image shown in FIG. 5 and a left/right edge image shown in FIG. 6 from the reference image constructed from a binary image a portion of which is shown as an example in FIG. 4. An edge image, for example, the left edge image, is generated by the following formula.

$$((A>1)\char`\^ A) \text{ AND } A$$

where A denotes the value of pixels on one horizontal line such as shown in FIG. 48, >1 indicates an operation for shifting the one-line pixel value A to the right by one pixel, ^ is an exclusive-OR operator, and AND is an AND operator. As can be seen from FIG. 48, the left edge image is obtained by performing the above operation for each line. The right edge image and the upper and lower edge images are similarly obtained. This processing is not necessary when directly using the binary image instead of the edge images. Further, as will be described in detail later, there are cases where an upper edge image, a lower edge image, a left edge image, and a right edge image, such as shown in FIGS. 7 to 10, are used separately, instead of using the upper/lower edge image and left/right edge image shown in FIGS. 5 and 6.

Figure 11:
FIG. 11 is a diagram showing a small block of the binary image.
Figure 12:
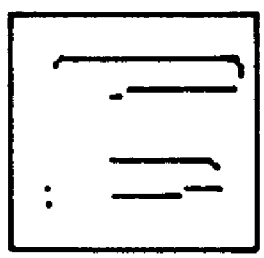
FIG. 12 is a diagram showing a small block of the upper/lower edge image.
Figure 13:
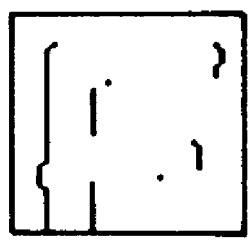
FIG. 13 is a diagram showing a small block of the left/right edge image.
Figure 14:
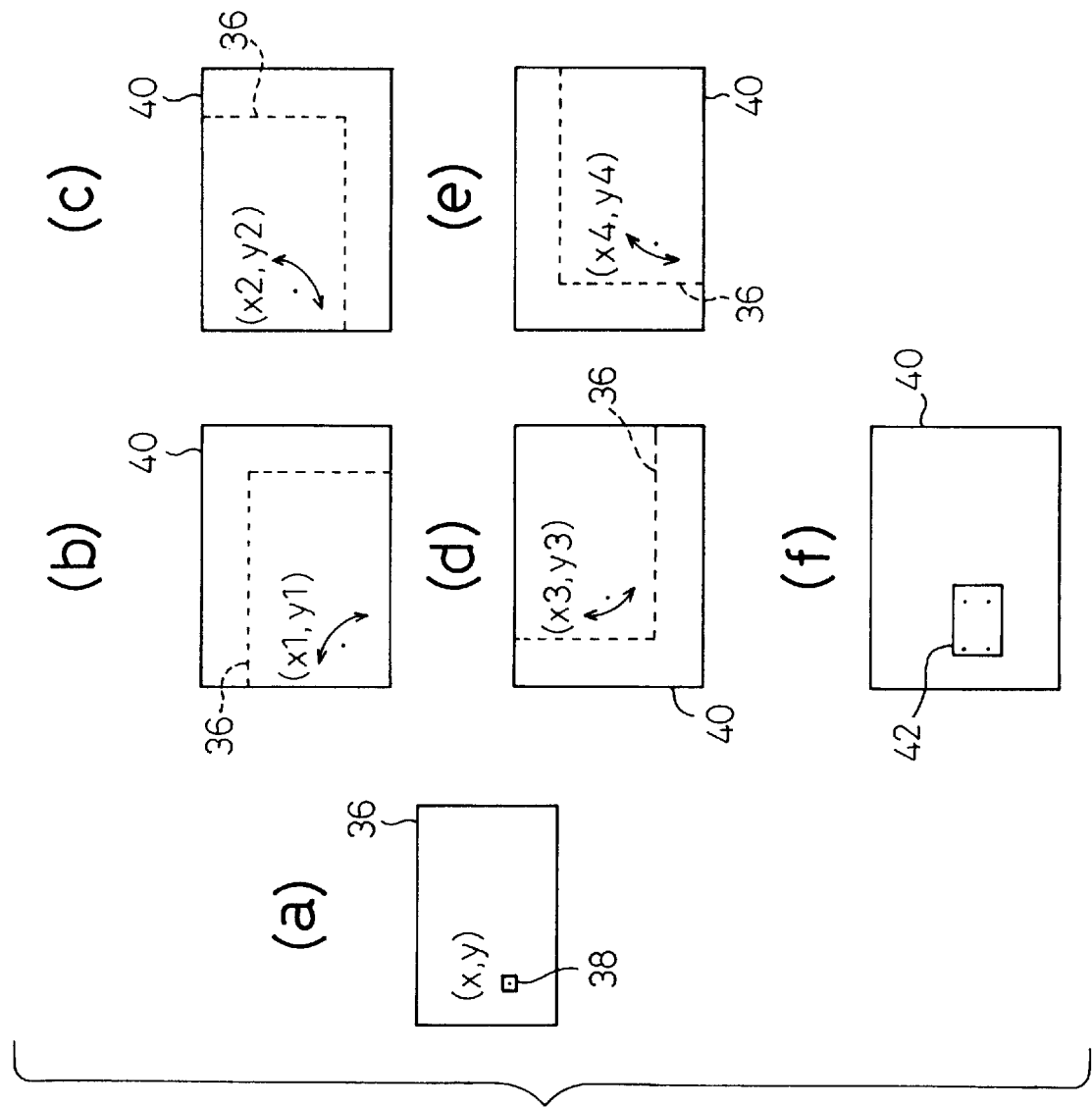
FIG. 14 is a diagram for explaining a method of determining an initial value of a search range.

Turning back to FIG. 3, a block divider 32 divides the reference image (binary image or edge image) into medium square blocks of about 250 pixels per side, for example, and further divides each medium block into small square blocks, for example, of 32×32 pixels, as shown in FIGS. 11 to 13. In the case of a 400 dpi (dots per inch) resolution, the length of 32 pixels is about 2 mm.

A search range/priority determining section 34, shown in FIG. 3, determines the initial value of the search range in an input image (binary image or edge image) and the initial value of the search priority, for each small block of the reference image (binary image or edge image). The initial value of the search range is determined based on the size of the reference image, the size of the input image, and the maximum and minimum scaling factors and maximum and minimum skew angles of the input image. For example, in determining the search range for a point (x, y) within a small block 38 in the reference image 36 shown in FIG. 14(a), first the reference image 36 is reduced in size as far as the minimum scaling factor allows, and the coordinates (x1, y1), (x2, y2), (x3, y3), and (x4, y4) in the input image are obtained that correspond to the coordinates (x, y) when the reduced reference image 36 is placed in each of the four corners of the input image 40, as shown in FIGS. 14(b) to (e). Next, the reduced reference image 36 thus placed is rotated between the maximum and minimum skew angles about each corner of the input image, to obtain the moving range of the coordinates. Similar processing is performed on the reference image enlarged as far as the maximum scaling factor allows. A circumscribed rectangle 42 (FIG. 14(f)) enclosing the coordinate range obtained for each point in the small block 38 shows the range that each point in the small block 38 can take within the maximum and minimum scaling factors and the maximum and minimum skew angles; therefore, this rectangle is set as the initial search range.

The search priority of each small block is determined by the score calculated from the number of black pixels in the small block and the size of its search range. The score Score (x0, y0) for a small block (x0, y0) is calculated, for example, by the following equations.

$$\text{Score }(x0, y0) = K \times (P_H(x0, y0) + P_V(x0, y0)) + L \times \Sigma(P_H(x, y) + P_V(x, y)) \quad (1)$$

if $$(P_H(x0, y0) >= P\_Threshold \,\&\&\, P_V(x0, y0) >= P\_Threshold) \quad (2)$$

$$\text{Score }(x0, y0) += \text{Bonus; if }(\text{SearchSize }(x0, y0) <= S\_Threshold) \quad (3)$$

Score (x0, y0)=Score (x0, y0)×M×(S_Threshold−SearchSize (x0, y0))

where && is a logic operator that sets the result true only when the results of the equations on both sides of it are both true, and ±=is an operator that adds the term on the right-hand side to the term on the left-hand side and then substitutes the result in the left-hand side. $P_H(x0, y0)$ is the number of upper and lower edge black pixels, and $P_V(x0, y0)$ is the number of left and right edge black pixels, in the small block (x0, y0) when the edge images are used. K is a weighting coefficient for the block (x0, y0), and $L \times \Sigma(P_H(x, y) + P_V(x, y))$ is the sum of counts of edge black pixels in neighboring blocks of (x0, y0) multiplied by weighting coefficient L. The length of a contour increases as the number of edge black pixels increases, making matching with the input image easier; therefore, in Equation (1), the score is given proportional to the number of edge pixels. Further, since matching is easier for regions where higher-score blocks cluster, the number of edge black pixels in the neighboring blocks is multiplied by the coefficient and added. If the number of left/right edge black pixels and the number of upper/lower edge black pixels are both above a prescribed count, the positioning in both the X and Y directions will become easier. Accordingly, the score is increased if they are both larger than the predetermined value P_Threshold in Equation (2). Further, since a smaller search range is less prone to error, the score is further increased if the search range SearchSize is equal to or smaller than a prescribed value. Here, the score is multiplied by M×(S_Threshold−SearchSize (x0, y0)) (where M is a coefficient) to increase the score as the search range becomes smaller. When using the binary signal directly, rather than generating edge images, $P_H(X0, y0)+P_V(x0, y0)$ and $P_H(x, y)+P_V(x, y)$ in Equation (1) are replaced by the number of black pixels in the binary image, P(x0, y0) and P(x, y), respectively, and the addition in Equation (2) is not performed.

Turning back to FIG. 3, the search range and search priority of each small block determined by the search range/priority determining section 34 are stored in a storage 37 along with the reference image divided into the blocks. The processing up to this point is performed only once when a blank form or questionnaire sheet is loaded into the reading apparatus 11 and its image is read into the personal computer 10 as a reference image.

An edge generator 44 generates an input edge image, by performing the same processing as the edge generator 30 did, on an input image read from a filled-out form or questionnaire sheet loaded into the reading apparatus 11. This processing is not necessary when image matching is performed directly using the binary image.

A block selector 46 retrieves the highest-priority small block and its search range data from among the small blocks stored in the storage 37 and remaining unprocessed for matching. A match judging section 48 searches the input image for a portion that matches the small block retrieved by the block selector 46.

Figure 5:
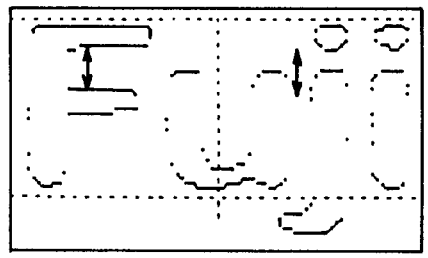
FIG. 5 is a diagram showing an upper/lower edge image.
Figure 6:
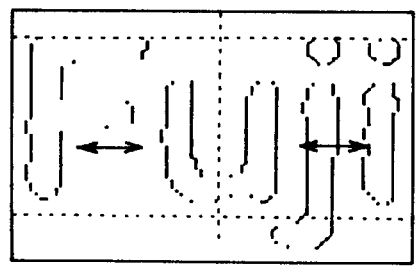
FIG. 6 is a diagram showing a left/right edge image.
Figure 7:
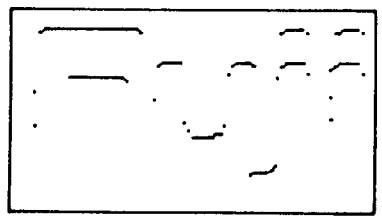
FIG. 7 is a diagram showing an upper edge image.
Figure 8:
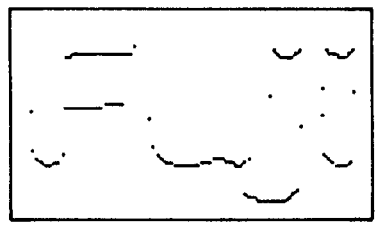
FIG. 8 is a diagram showing a lower edge image.
Figure 9:
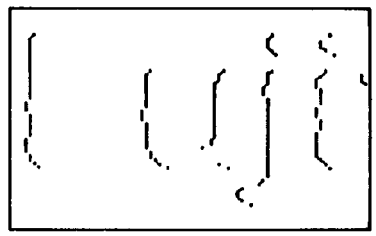
FIG. 9 is a diagram showing a left edge image.
Figure 10:
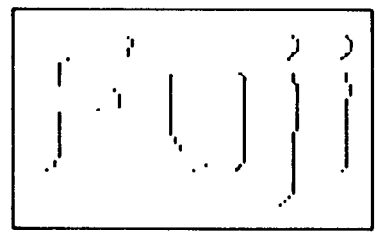
FIG. 10 is a diagram showing a right edge image.
Figure 15:
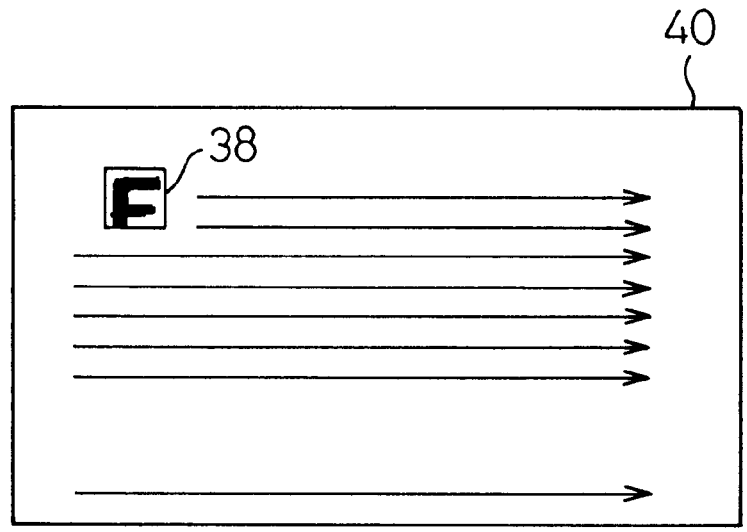
FIG. 15 is a diagram for explaining a first method of match judgement.
Figure 16:
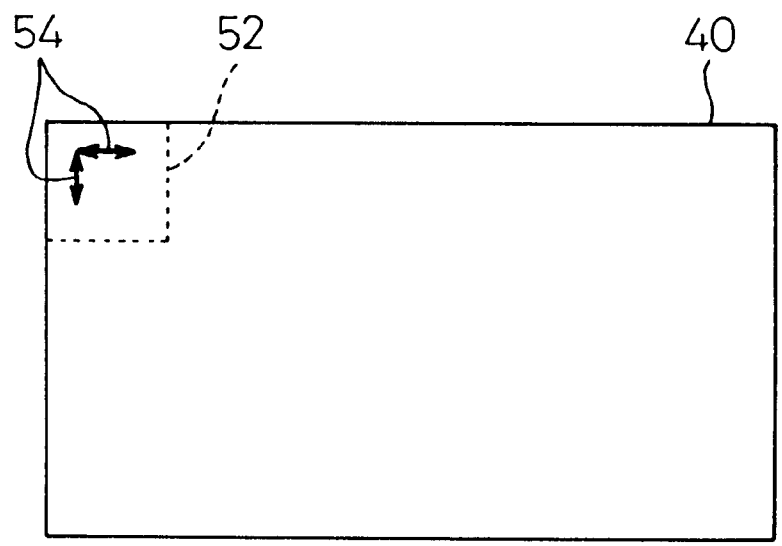
FIG. 16 is a diagram for explaining a second method of match judgement.

Judgement for matching may be performed, for example, by moving the small block 38 of the binary image across the entire area of the input image 40, as shown in FIG. 15, and searching for a region where the number of pixels with matching values is larger than a threshold and the largest of all, but this method would require an enormous amount of computation. If the search range is narrowed as shown by dotted lines in FIG. 16, the amount of computation proportional to the area of the search range is necessary. However, if the size of the small block is sufficiently small, and its search range is sufficiently narrowed, the amount of computation can be drastically reduced by searching in the horizontal and vertical directions independently of each other, as shown by arrows 54 in FIG. 16. Furthermore, if, instead of using the binary image, the upper/lower edge image of FIG. 5 is used for searching in the vertical direction and the left/right edge image of FIG. 6 for searching in the horizontal direction, not only the amount of computation can be reduced further, but the effects of color dropouts in all-black portions can be reduced.

Figure 17:
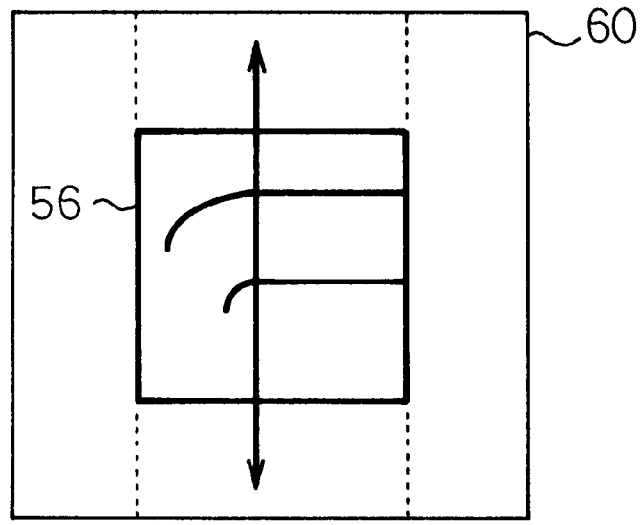
FIG. 17 is a diagram for explaining a third method of match judgement.
Figure 18:
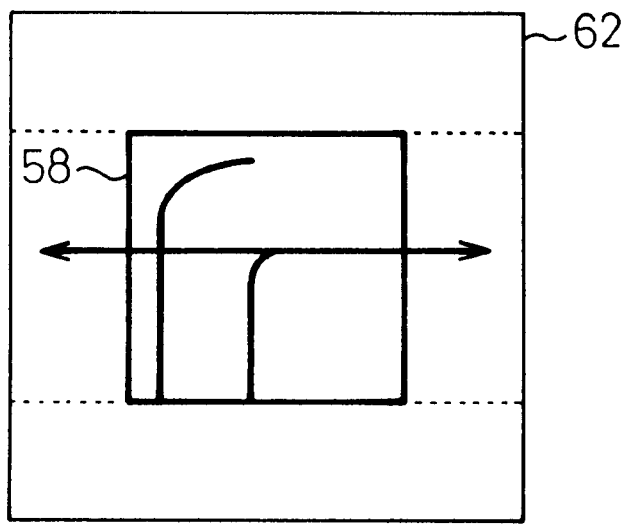
FIG. 18 is a diagram for explaining the third method of match judgement.
Figure 19:
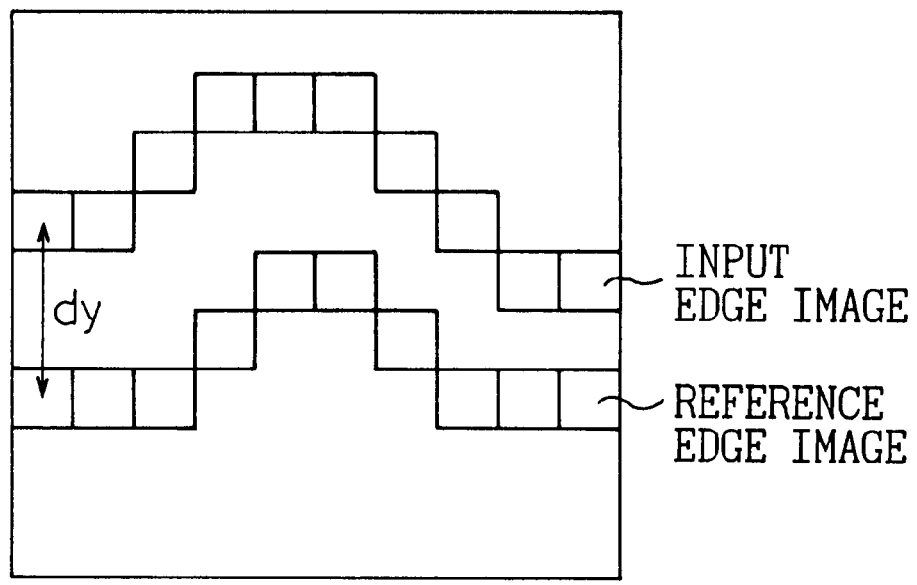
FIG. 19 is a diagram for explaining the third method of match judgement.
Figure 20:
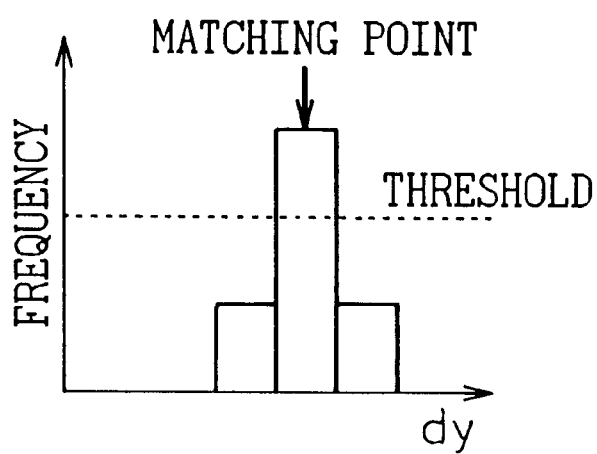
FIG. 20 is a diagram for explaining the third method of match judgement.

Further, in the present invention, rather than actually moving the edge images in the horizontal and vertical directions, the upper/lower edge image 56 and the left/right edge image 58 are respectively superimposed at the centers (estimated positions) of the search ranges 60 and 62 of the input upper/lower edge image and input left/right edge image, as shown in FIG. 17 and 18, and the distances between both edges in the vertical and horizontal directions, dx or dy, are calculated (FIG. 19); then, those whose frequencies of appearance exceed a predetermined threshold in the distance histogram shown in FIG. 20 are taken as the displacements, dx and dy, from the estimated position of the matching point, thereby determining the corresponding position. In the histogram of FIG. 20, it is desirable to accommodate the unevenness of the distribution due to the raggedness of the edges by taking a moving average between the three points including the left and right two points.

Figure 21:
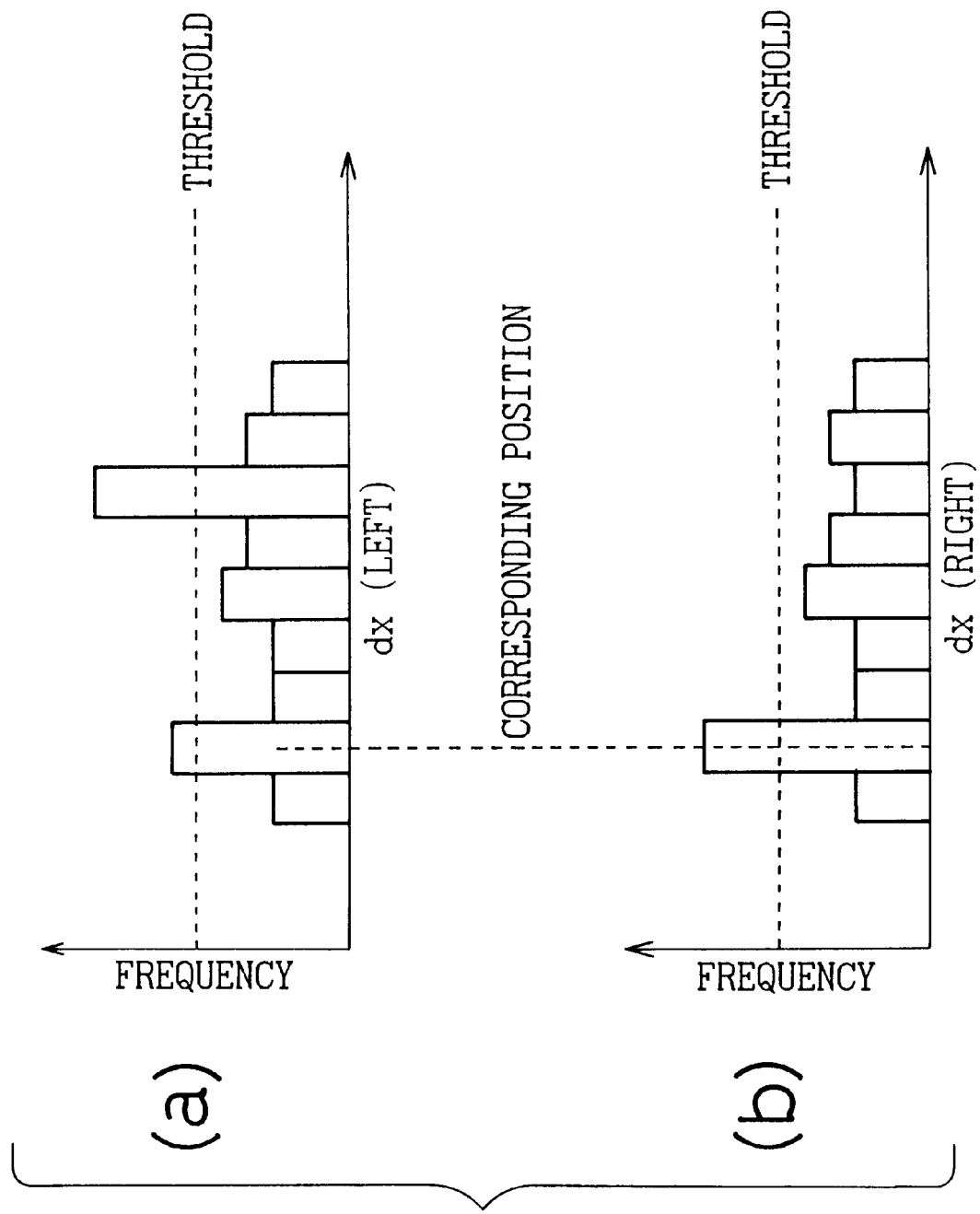
FIG. 21 is a diagram for explaining a fourth method of match judgement.
Figure 22:
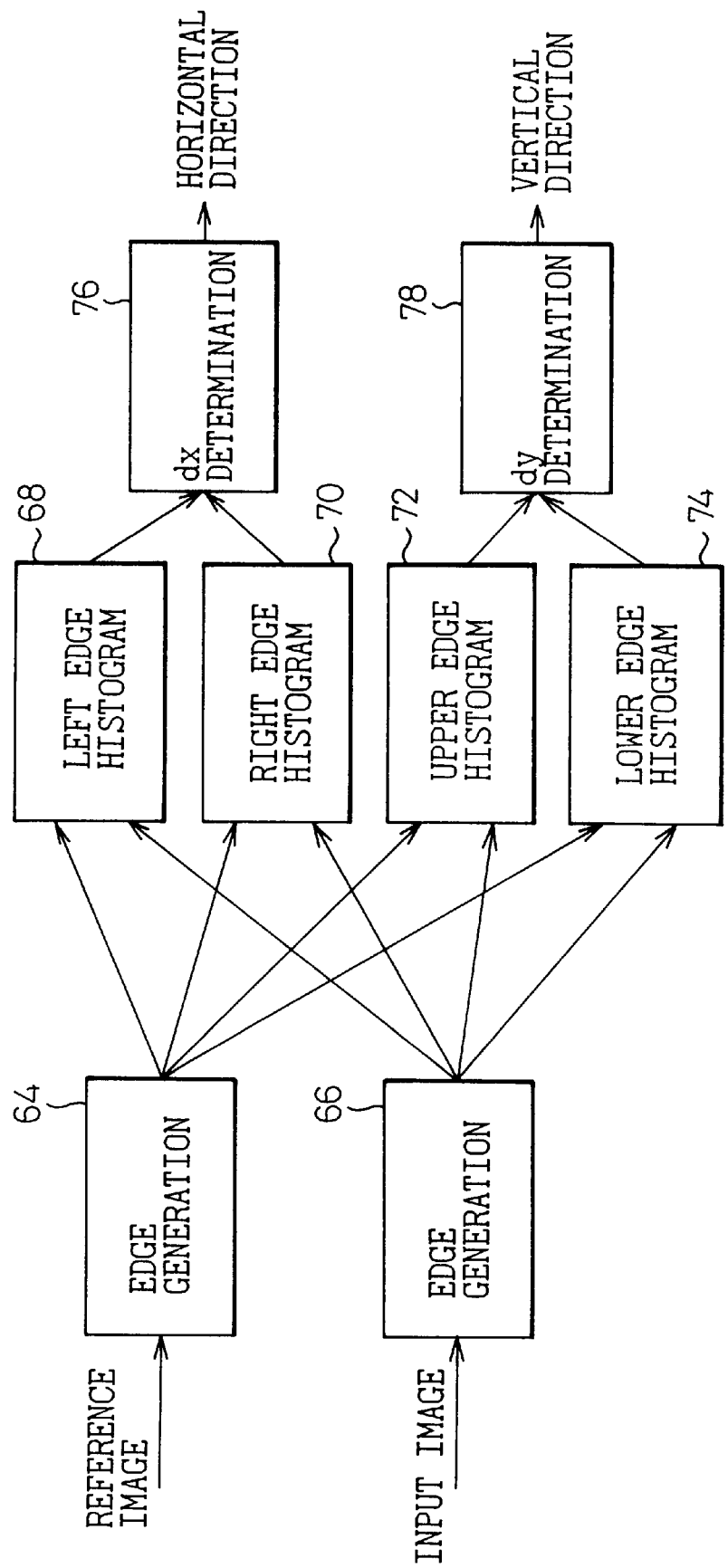
FIG. 22 is a functional block diagram for explaining the fourth method of match judgement.

With the above method that uses the upper/lower and left/right edge images, it is difficult to obtain a histogram that has peaks exceeding the threshold when line thickness varies due to variations in printing contrast or image brightness. In an alternative method, therefore, the distribution of dx or dy is obtained, as shown in FIG. 21, separately for each of the upper, lower, left, and right edge images shown in FIGS. 7 to 10, and the average of peak positions matching within prescribed error limits between the upper and lower edges is taken as the amount of vertical displacement, while the average of peak positions matching within prescribed error limits between the left and right edges is taken as the amount of horizontal displacement. FIG. 22 is a functional block diagram of a section that computes the amounts of displacement from the estimated position by using this method. An edge generator 64 generates the upper, lower, left, and right edge images from the reference image, and an edge generator 66 generates the upper, lower, left, and right edge images from the input image. A left-edge histogram generator 68 generates a histogram, such as shown in FIG. 21(a), of the distance dx in the x direction between the left edge images of the reference image and input image, and a right-edge histogram generator 70 generates a histogram, such as shown in FIG. 21(b), of the distance dx in the x direction between the right edge images of the reference image and input image. Likewise, an upper-edge histogram generator 72 and a lower-edge histogram generator 74 generate histograms of the distance dy between the upper edge images and between the lower edge images, respectively. A dx determining section 76 determines, as the amount of horizontal displacement dx, the average of the peak positions exceeding the threshold and matching within the prescribed error limits between the left-edge and right-edge histograms (see FIG. 21), and a dy determining section 78 determines as the amount of vertical displacement the average of the peak positions exceeding the threshold and matching within the prescribed error limits between the upper-edge and lower-edge histograms.

Turning back to FIG. 3, when the displacement amounts, dx and dy, from the estimated position have been determined for the small block processed by the match judging section 48, then it is determined that matching has been successfully accomplished for that small block, and a corresponding position determining section 50 determines the corresponding position from the estimated corresponding position and the displacement amounts dx and dy, and stores it in the storage 37. A search range/priority updating section 80, based on the thus determined corresponding position of the small block, updates the search range and search priority for other small blocks remaining unprocessed for matching, and stores them in the storage 37. The detailed operation of the search range/priority updating section 80 will be described later.

By repeating the above-described operations of the blocks 46, 48, 50, and 80, matching is performed for all the small blocks.

Figure 23:
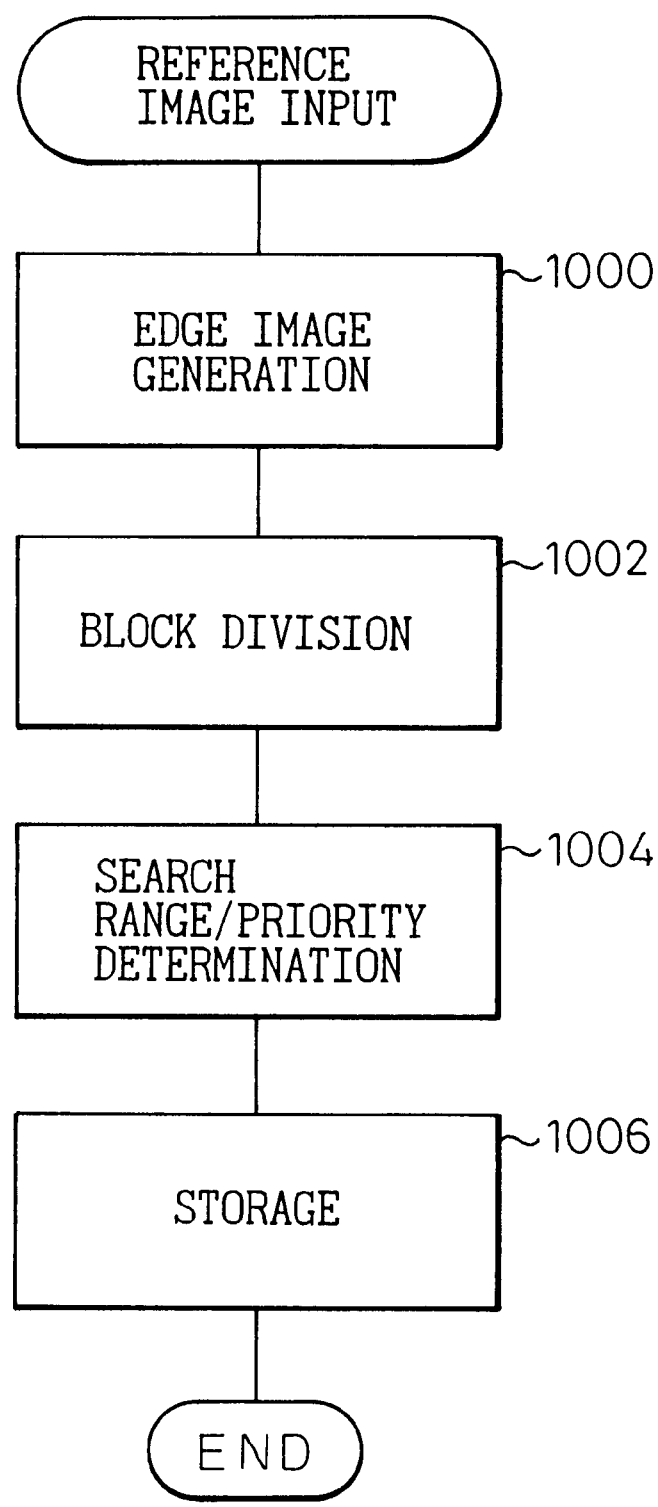
FIG. 23 is a flowchart illustrating the operation of the image matching apparatus.

FIG. 23 is a flowchart illustrating the operation of the image matching apparatus when a blank form or questionnaire sheet is set in the hopper 14 of the reading apparatus 11 and the reference image is read. In FIG. 23, when a binary image of the reference image is input, in step 1000 the edge generator 30 generates edge images from the input binary image. As already described, this processing is omitted when directly using the binary image to determine the corresponding position. Next, in step 1002, the block divider 32 divides the image into medium blocks and then into small blocks, and in step 1004, the search range/priority determining section 34 determines the initial values of the search range and search priority for each small block. In step 1006, the reference image (binary image or edge image) divided into blocks is stored in the storage 37 together with the search range and search priority.

Figure 24:
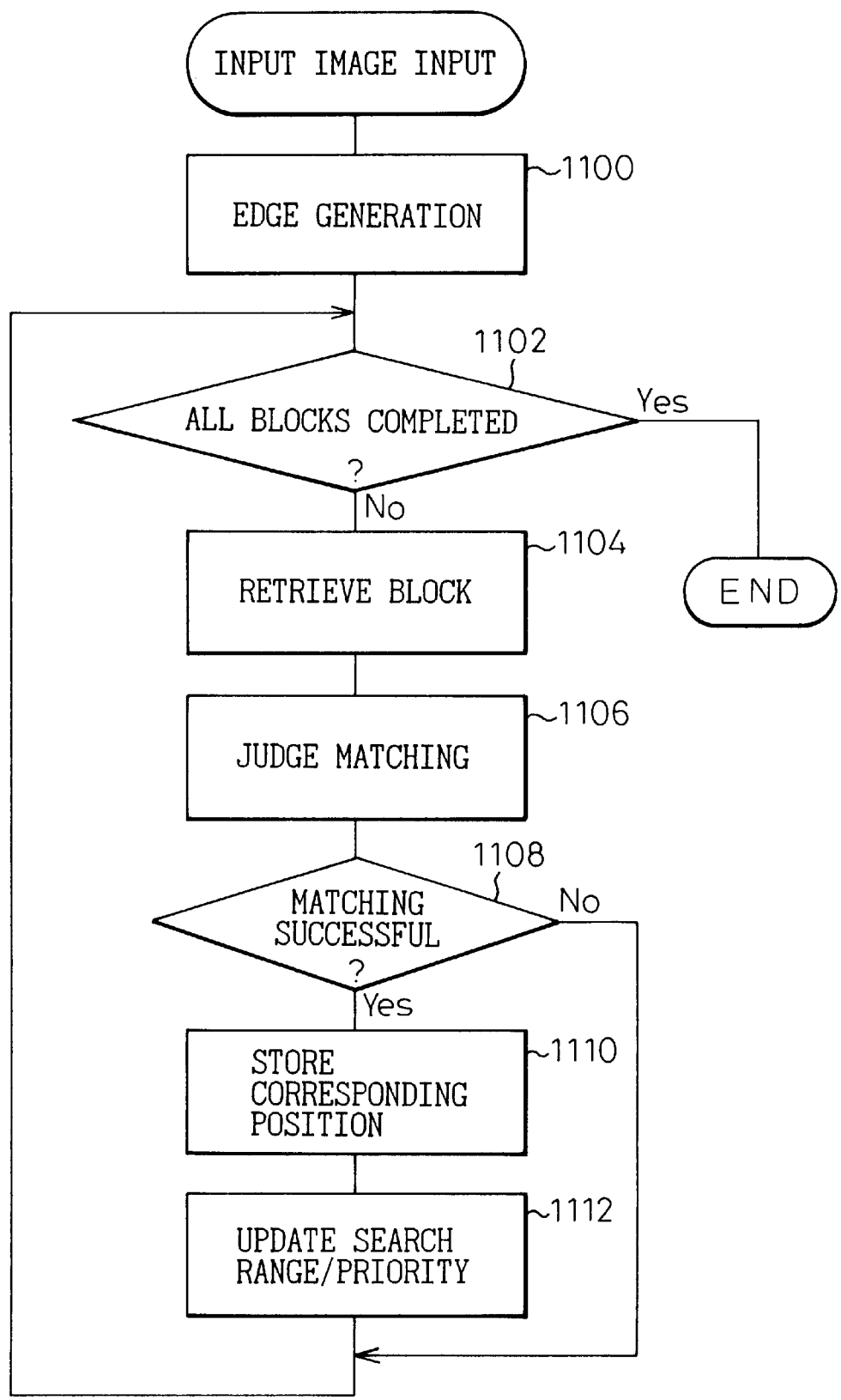
FIG. 24 is a flowchart illustrating the operation of the image matching apparatus.

FIG. 24 is a flowchart illustrating the operation of the image matching apparatus when filled-out form sheets or questionnaire sheets are stacked in the hopper 14 of the reading apparatus 11 and an input image is read. In FIG. 24, when a binary image of the input image is input, in step 1100 the edge generator 44 generates edge images from the binary image. As already described, this processing is omitted when directly using the binary image to determine the corresponding position. Next, in step 1102, it is determined whether the judgement for matching has been completed for all the small blocks; if it is not yet completed, in step 1104 the block selector 46 retrieves the highest-priority small block and its search range data from among the small blocks remaining unprocessed for matching judgement. In step 1106, the match judging section 48 judges the matching of the small block of the reference image with the input image within the search range, and if the matching is accomplished successfully, in step 1110 the corresponding position determining section 50 determines the corresponding position from the displacement amounts dx and dy and stores it in the storage 37. In step 1112, the search range/priority updating section 80, based on the thus determined corresponding position of the small block, updates the search range and search priority for other small blocks remaining unprocessed for matching, and stores them in the storage 37, after which the process returns to step 1102.

In the search range/priority updating section 80, the search range for the small blocks remaining unprocessed for matching is narrowed by using the following three methods.

(1) For small blocks in the neighborhood of the small block whose corresponding position has already been determined, the search range for each neighboring small block is determined based on the already determined corresponding position, and these neighboring blocks are processed preferentially for matching.

(2) The search range for the small blocks located inside a triangle with its vertices at three small blocks whose corresponding positions have already been determined, is determined by linear interpolation from the corresponding positions of the small blocks at the vertices.

(3) From the already determined corresponding positions of a plurality of small blocks, the values of transformation parameters for the medium block (previously described) are determined using a least squares method, and the values of the thus determined transformation parameters are in turn used to determine the search range for the small blocks remaining unprocessed.

Figure 25:
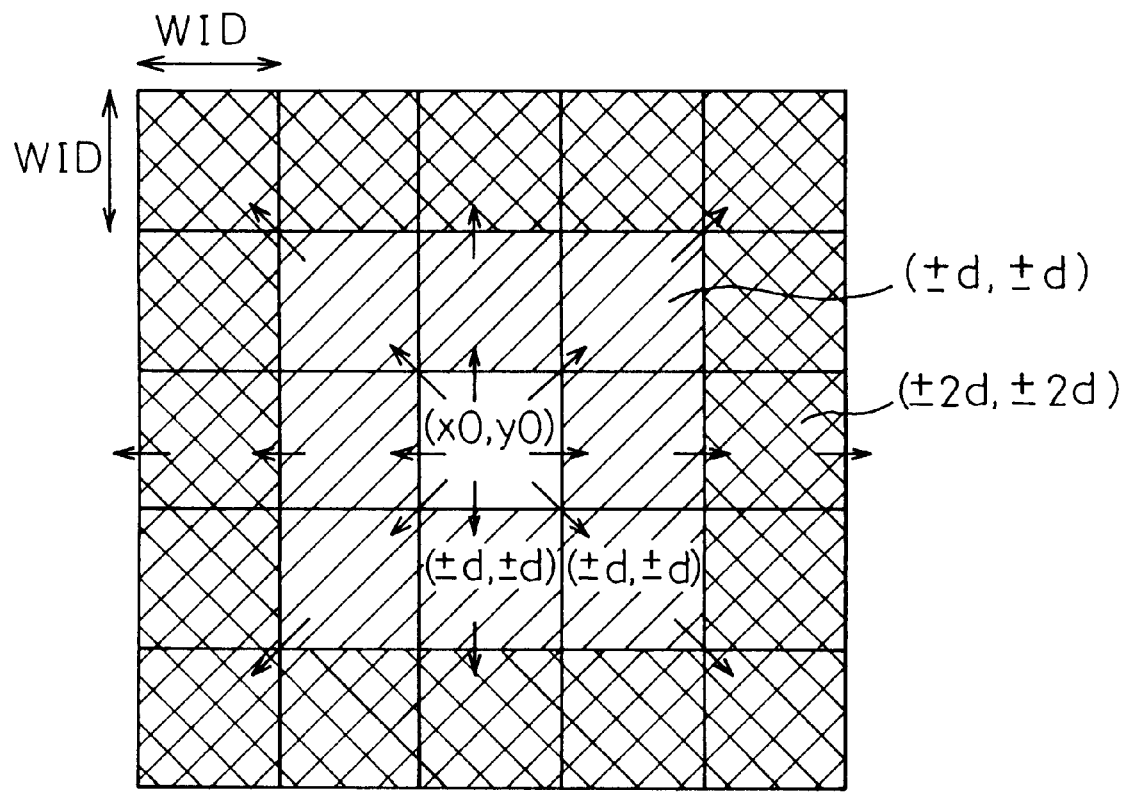
FIG. 25 is a diagram for explaining a first method for narrowing the search range.

In the method (1), estimated positions of twenty four small blocks in the vicinity of a small block (x0, y0) whose corresponding position has already been determined are calculated from the corresponding positions of the small blocks (x0, y0) and block size WID, ignoring deformation of block shapes, as shown in FIG. 25. The corresponding positions of the neighboring eight small blocks indicated by hatching in FIG. 25 are searched for within ranges of the respective estimated positions ±d. The corresponding positions of sixteen small blocks surrounding the eight small blocks and indicated by crosshatching in FIG. 25 are searched for within ranges of the respective estimated positions ±2d. Here, d is determined by $$d = dM \times WID$$

where dM is a constant which is determined considering the maximum allowable scaling factor and maximum skew angle. If dM is ⅛ and WID is 32 pixels long, then d is 4 pixels long.

Figure 26:
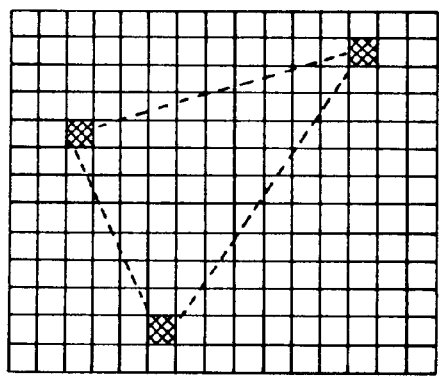
FIG. 26 is a diagram for explaining a second method for narrowing the search range.
Figure 27:
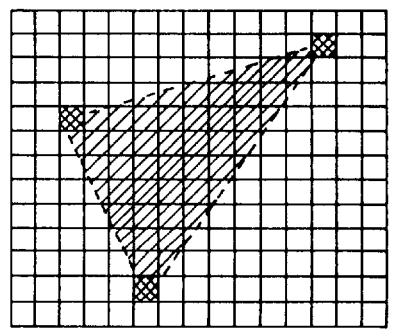
FIG. 27 is a diagram for explaining the second method for narrowing the search range.

In the method (2), assuming that the corresponding positions of the three small blocks indicated by crosshatching in FIG. 26 are already determined, the estimated corresponding positions of the small blocks indicated by hatching in FIG. 27 are determined by interpolation from the corresponding positions of the three small blocks at the vertices. If this method is applied to an excessively large triangle, the error will become large; therefore, it is desirable to limit the size of the triangle to the size of a medium block at maximum. In this case, processing can be simplified if the triangle is limited to one that is formed within one medium block. Since this method is less precise than the method (1), the search range should be limited, for example, to within the estimated corresponding position ±2d.

Figure 28:
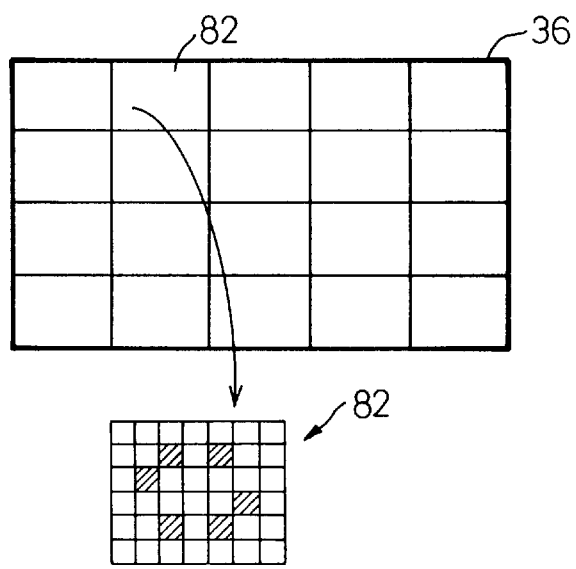
FIG. 28 is a diagram for explaining a third method for narrowing the search range.
Figure 29:
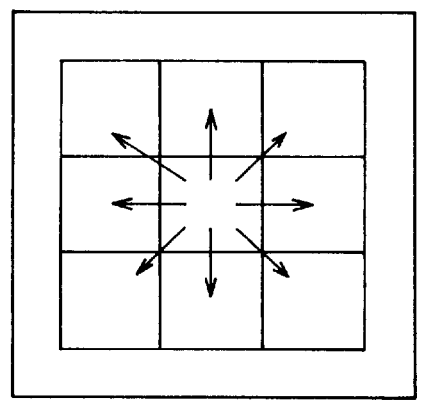
FIG. 29 is a diagram for explaining the third method for narrowing the search range.
Figure 30:
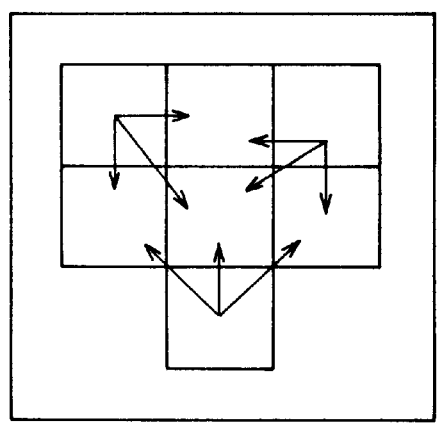
FIG. 30 is a diagram for explaining the third method for narrowing the search range.

In the method (3), if corresponding positions are already determined for more than a prescribed number of small blocks as indicated by hatching within one medium block of the reference image 36, as shown in FIG. 28, the values of transformation parameters for the medium block, i.e., the horizontal (x direction) and vertical (y direction) scaling factors, skew, and positional displacement of the entire medium block, are determined using a least squares method from the data of the already determined corresponding positions, and the thus determined values are in turn used to calculate the estimated corresponding positions of the small blocks remaining unprocessed within the medium block. In the case of a medium block for which the transformation parameters cannot be calculated because the number of already determined small blocks is not more than the prescribed value, the estimated corresponding positions of the yet-to-be-determined blocks within the medium block are determined using the values of an adjacent medium block for which the transformation parameters have been calculated successfully, as shown in FIG. 29. If there is more than one adjacent medium block for which the values of the transformation parameters have already been calculated, as shown in FIG. 30, the average is taken between them, for example. According to the method (3), estimated corresponding positions can be obtained over the entire region even when the image contains a large blank area.

The following describes how the transformation parameters for a medium block are calculated using the least squares method and how the estimated corresponding positions of small blocks are calculated backward from the values of the transformation parameters.

Here it is assumed that the coordinates, for example, of the center of a small block in the reference image are $p_i=(px_i, py_i)$, and the corresponding coordinates in the input image are $q_i=(qx_i, qy_i)$, and that there are n such pairs (i=1 to n).

First, the following equations are calculated.

$A=\Sigma(qx \cdot px)-(\Sigma qx \cdot \Sigma px)/n$ $B=\Sigma(px \cdot px)-(\Sigma px \cdot \Sigma px)/n$ $C=\Sigma(px \cdot py)-(\Sigma px \cdot \Sigma py)/n$ $D=\Sigma(qx \cdot py)-(\Sigma qx \cdot \Sigma py)/n$ $E=\Sigma(py \cdot py)-(\Sigma py \cdot \Sigma py)/n$ $F=\Sigma(qy \cdot py)-(\Sigma qy \cdot \Sigma py)/n$ $G=\Sigma(qy \cdot px)-(\Sigma qy \cdot \Sigma px)/n$ Here, $\Sigma(qx \cdot px)=qx1 \cdot px1+qx2 \cdot px2+\ldots qxn \cdot pxn$ (summation of the 1st to n-th points). The other summations are similarly defined.

Using A to G above, the following values are calculated. However, if any one of the three values, DD, D1, or D2, is 0, no further calculations can be done (the arrangement does not allow calculation; for example, the points are arranged on one straight line).

$DD=B \cdot E-C \cdot C$ $D1=A \cdot E-D \cdot C$ $D2=B \cdot F-C \cdot G$

From these, the following values are determined.

kx=(A·E−D·C)/DD: Scaling factor in X direction ky=(B·F−C·G)/DD: Scaling factor in Y direction Using the above kx and ky, the following calculations are carried out to calculate skew θ.

$DL1=kx \cdot kx \cdot E+ky \cdot ky \cdot B$ $DL2=kx \cdot D-ky \cdot G-(kx \cdot kx-ky \cdot ky) \cdot C$ θ=−DL2/DL1 (radian)

The skew cannot be obtained when DL1=0, a special case where, for example, the scaling factor is 0.

Using the skew θ, the positional displacement amounts are obtained as follows:

dx=(Σqx−kx·(Σpx−θ·Σpy))/n: Amount of positional displacement in X direction dy=(Σqy−ky·(Σpy+θ·Σpx))/n: Amount of positional displacement in Y direction In this way, the transformation parameters, (kx, ky), (dx, dy), and the value of θ, for the medium block are calculated. From these, the estimated corresponding positions of the small blocks yet to be determined are calculated by the following equations.

$qxi=kx(pxi \cos \theta - pyi \sin \theta)+dx$ $qyi=ky(pxi \sin \theta + pyi \cos \theta)+dy$ The earlier given least squares calculation equations are derived from these equations.

The search range in the method (3) is set, for example, as the estimated corresponding position ±2d.

Of the above methods (1) to (3), the method (1) has the highest precision, but the range where the search range can be narrowed is small. On the other hand, with the method (3), the search range can be narrowed across the entire region of a medium block, but the precision is low. The method (2) has a property intermediate between (1) and (3). In view of this, matching is performed in order of initial priority value, and as matching is accomplished successfully for one small block, the method (1) is applied to its neighboring small blocks, one after another until the method can no longer be applied. When matching has been tried on all the small blocks, a convex hull containing, for example, all the center points of the successfully matched small blocks is created for each medium block, and a polygon defined by this convex hull is divided into triangles, to each of which the method (2) is applied. At this time, if there is a small block for which matching has been accomplished successfully, the method (1) is applied to its neighboring small blocks, one after another until the method can no longer be used. Finally, the method (3) is applied, and if there is a small block for which matching has been accomplished successfully, again the method (1) is applied to its neighboring small blocks, one after another until the method can no longer be applied.

Figure 31:
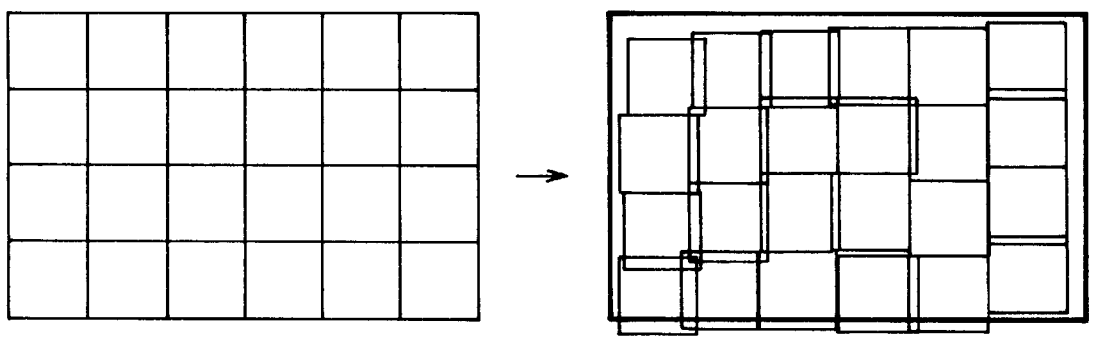
FIG. 31 is a diagram for explaining the result of matching by the image matching apparatus.

Using the image matching apparatus of the present invention shown in FIG. 3, matching can be performed without relying on specific elements such as line segments and tables as in the prior art. Further, the reference image is divided into small blocks, and the small blocks are sequentially applied to the input image for matching. Accordingly, when the matching is done, as shown in FIG. 31, the blocks are displaced according to the degree of distortion of the input image, which makes it possible to absorb the stretching/shrinking, skewing, and local distortions of the input image.

Figure 32:
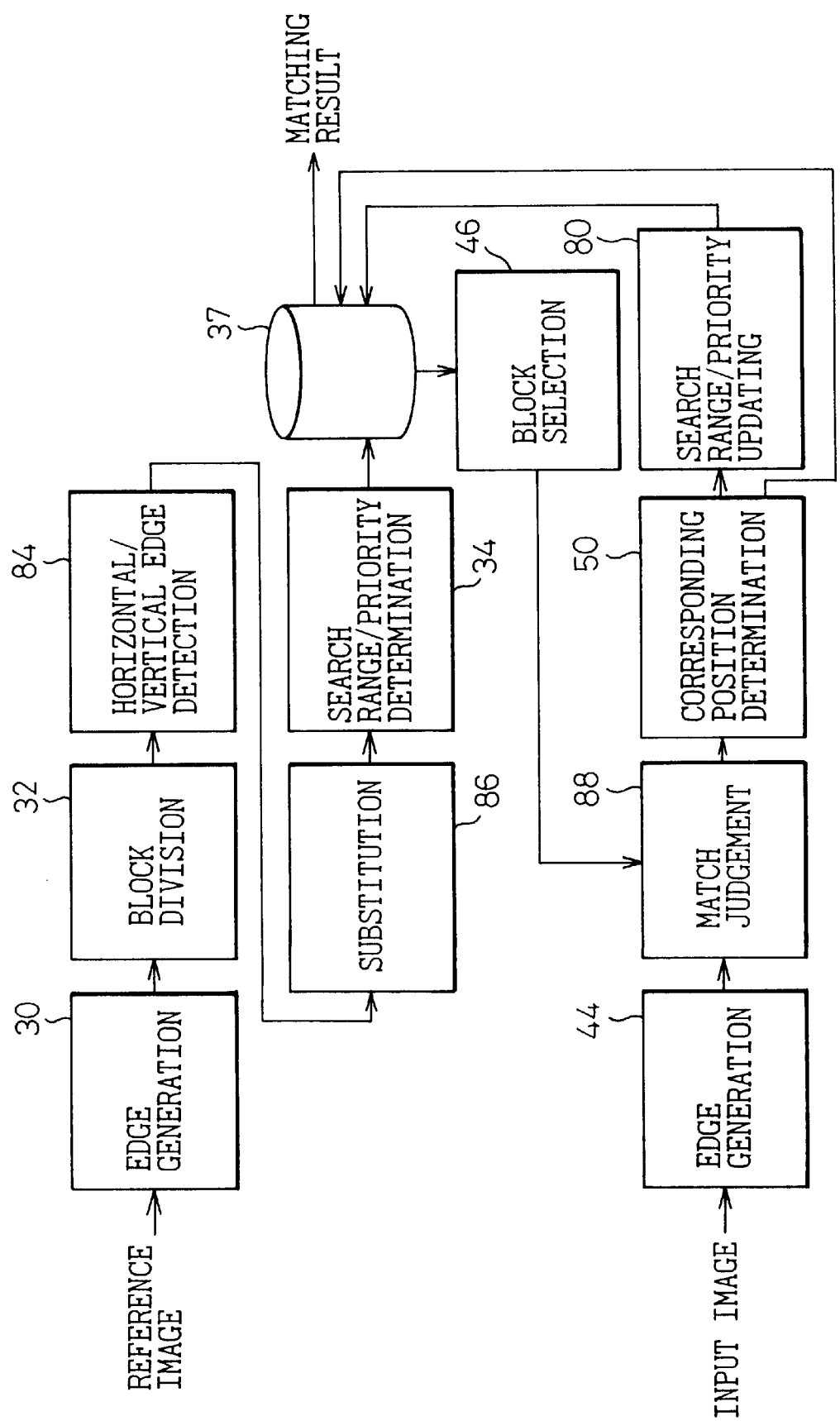
FIG. 32 is a functional block diagram of a first modification of the image matching apparatus.

FIG. 32 is a functional block diagram of one modification of the matching apparatus shown in FIG. 3. The same constituent elements as those in FIG. 3 are designated by the same reference numerals, and explanatory descriptions of such elements are omitted.

In FIG. 32, a horizontal/vertical edge detector 84 detects from the binary image images of straight lines running in the horizontal direction and straight lines running in the vertical direction of the screen, and thereby determines the positions of horizontal edges and vertical edges in terms of y-intercept values and x-intercept values, respectively. A substitution section 86 substitutes the y-intercept values for data on the upper and lower edges corresponding to the detected horizontal straight lines and the x-intercept values for data on the left and right edges corresponding to the detected vertical straight lines, thus reducing the data amount. In a match judging section 88, since the y-intercept values are used for the upper and lower edges detected as the horizontal straight lines and the x-intercept values are used for the left and right edges detected as the vertical straight lines, the amount of processing is drastically reduced.

Figure 33:
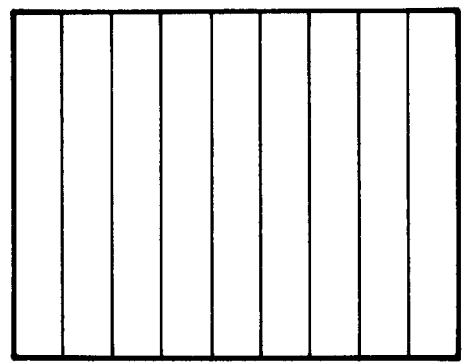
FIG. 33 is a diagram for explaining the operation of the apparatus of FIG. 32.
Figure 34:
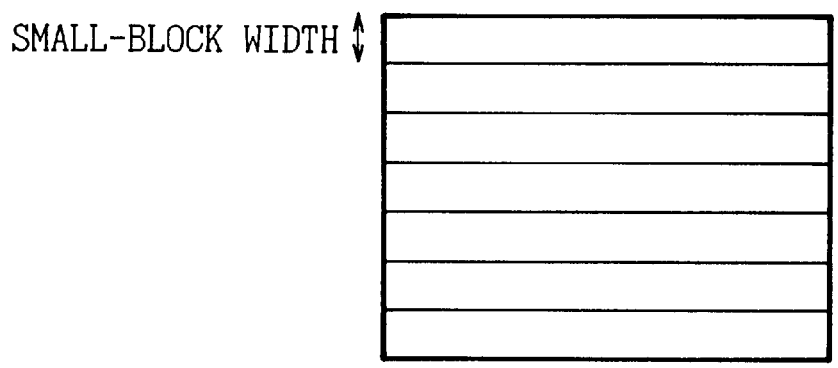
FIG. 34 is a diagram for explaining the operation of the apparatus of FIG. 32.
Figure 35:
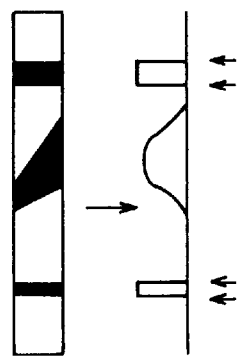
FIG. 35 is a diagram for explaining the operation of the apparatus of FIG. 32.
Figure 36:
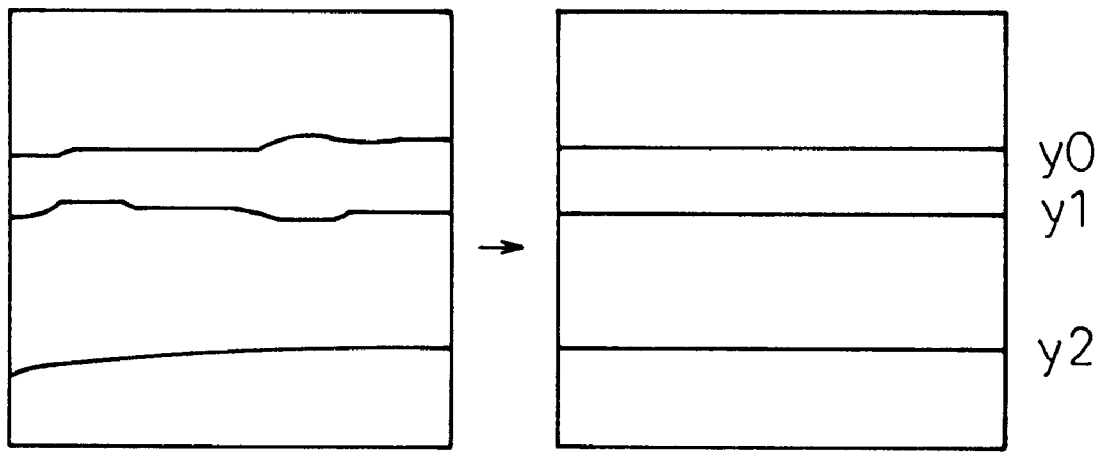
FIG. 36 is a diagram for explaining the operation of the apparatus of FIG. 32.

The above process will be described in further detail with reference to FIGS. 33 to 36. Consider here the binary image of the reference image divided into vertical stripes and horizontal stripes as shown in FIGS. 33 and 34, each stripe having a width equal to the width of a small block. For each vertical stripe, the vertical distribution of black pixels in the binary image within the stripe as shown in the left side of FIG. 35 is calculated as shown in the right side of FIG. 35, and the regions where the numbers of black pixels change abruptly as indicated by arrows are detected as the upper or lower edges. Then, as shown in FIG. 36, the upper and lower edges in each small block are replaced by y-intercept values, y0, y1, and y2. The x-intercepts are similarly determined for the horizontal stripes, and the left and right edges are replaced by the x-intercept values.

As can be seen from FIG. 36, even if the edges are somewhat slanted, the slanting can be ignored since the block size is small. Further, even if the edges are somewhat irregular, matching can be done with good accuracy.

Figure 37:
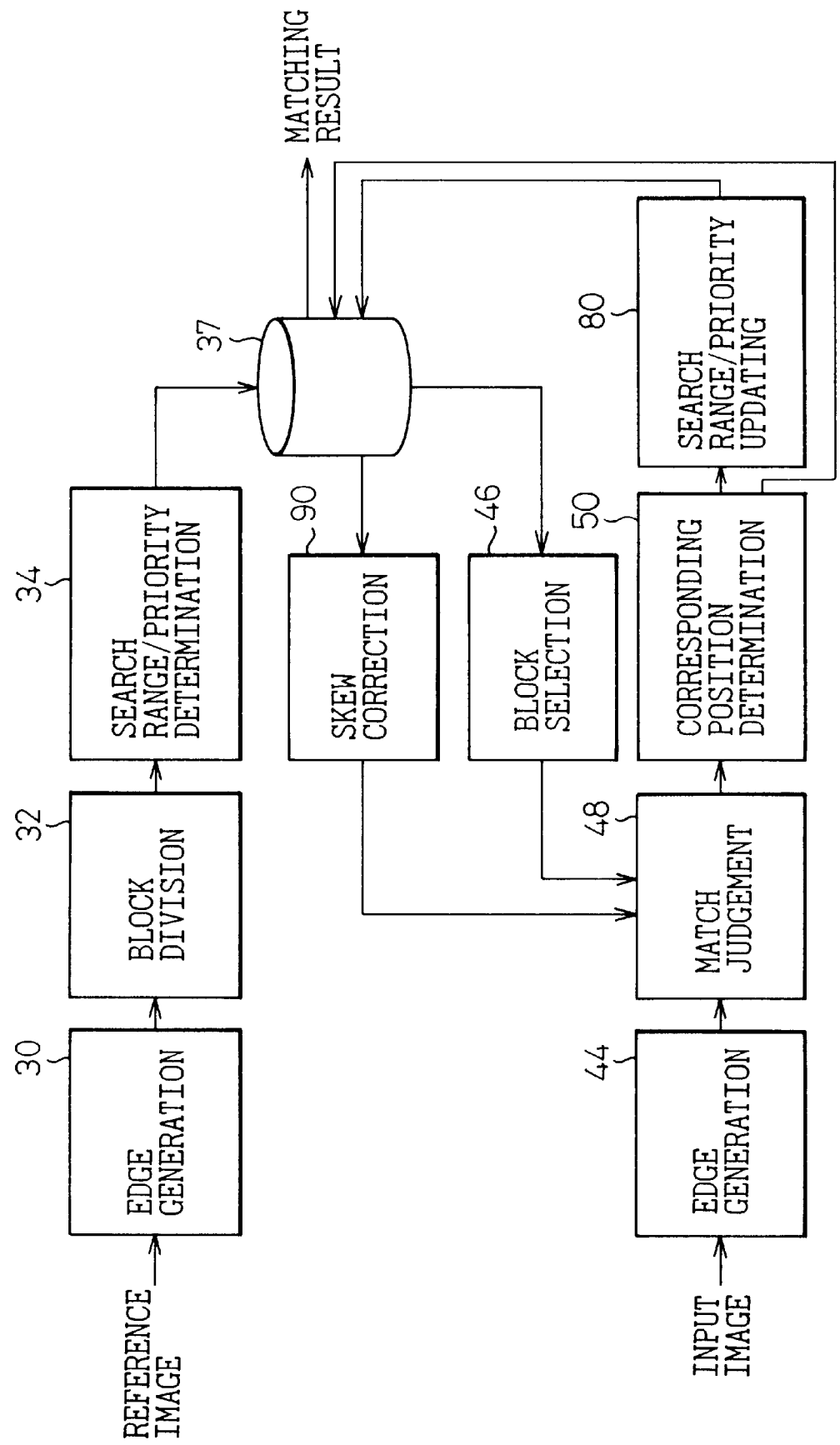
FIG. 37 is a functional block diagram of a second modification of the image matching apparatus.

FIG. 37 is a functional block diagram of another modification of the matching apparatus of FIG. 3. The same constituent elements as those in FIG. 3 are designated by the same reference numerals, and explanatory descriptions of such elements are omitted.

Figure 38:
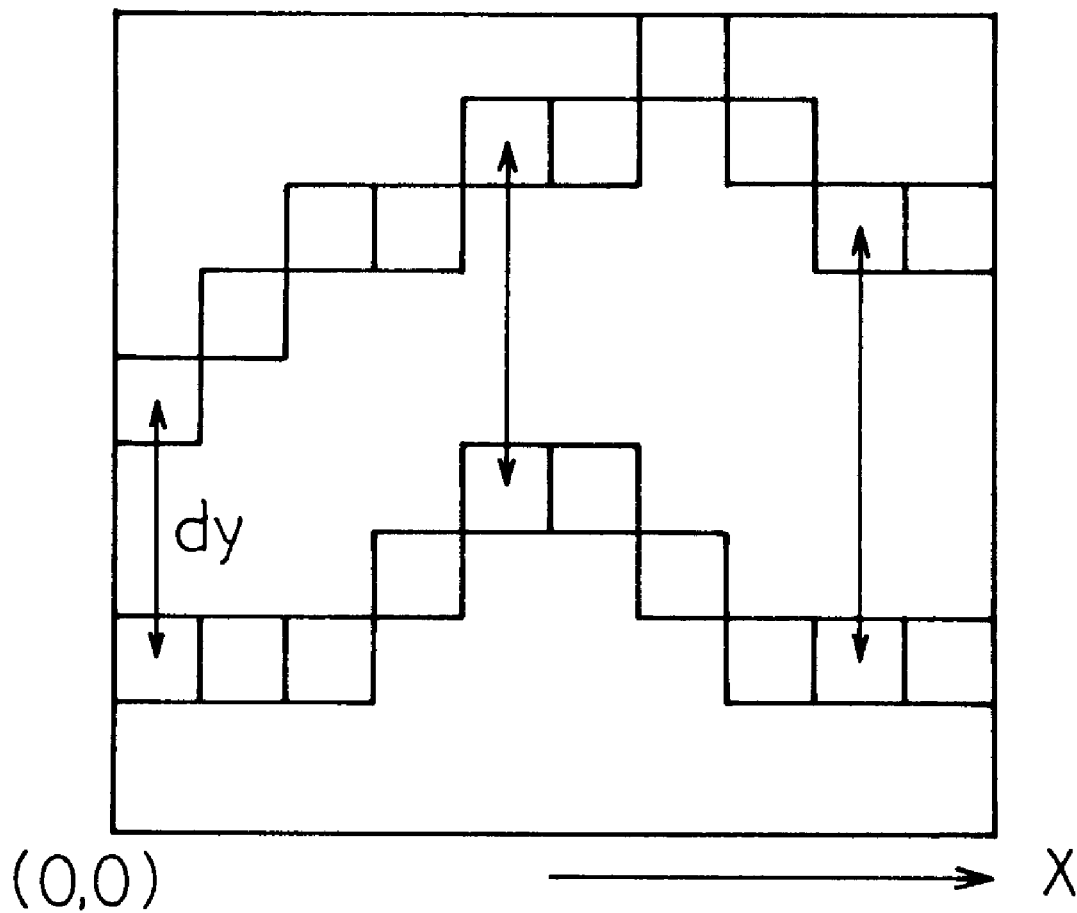
FIG. 38 is a diagram for explaining the operation of the apparatus of FIG. 37.

If the input image is skewed relative to the reference image, as shown in FIG. 38, correct matching may not be achieved. A skew corrector 90, based on the skew angle θ of the medium block determined by the previously described method (3), corrects the displacement amount dy used for match judgement in the match judging section 48 by performing the calculation $$dy' = dy \cdot X \cdot \theta$$

on the small blocks within that medium block, thereby enabling correct matching to be done in the presence of skew (for X in the above equation, refer to FIG. 38).

Figure 39:
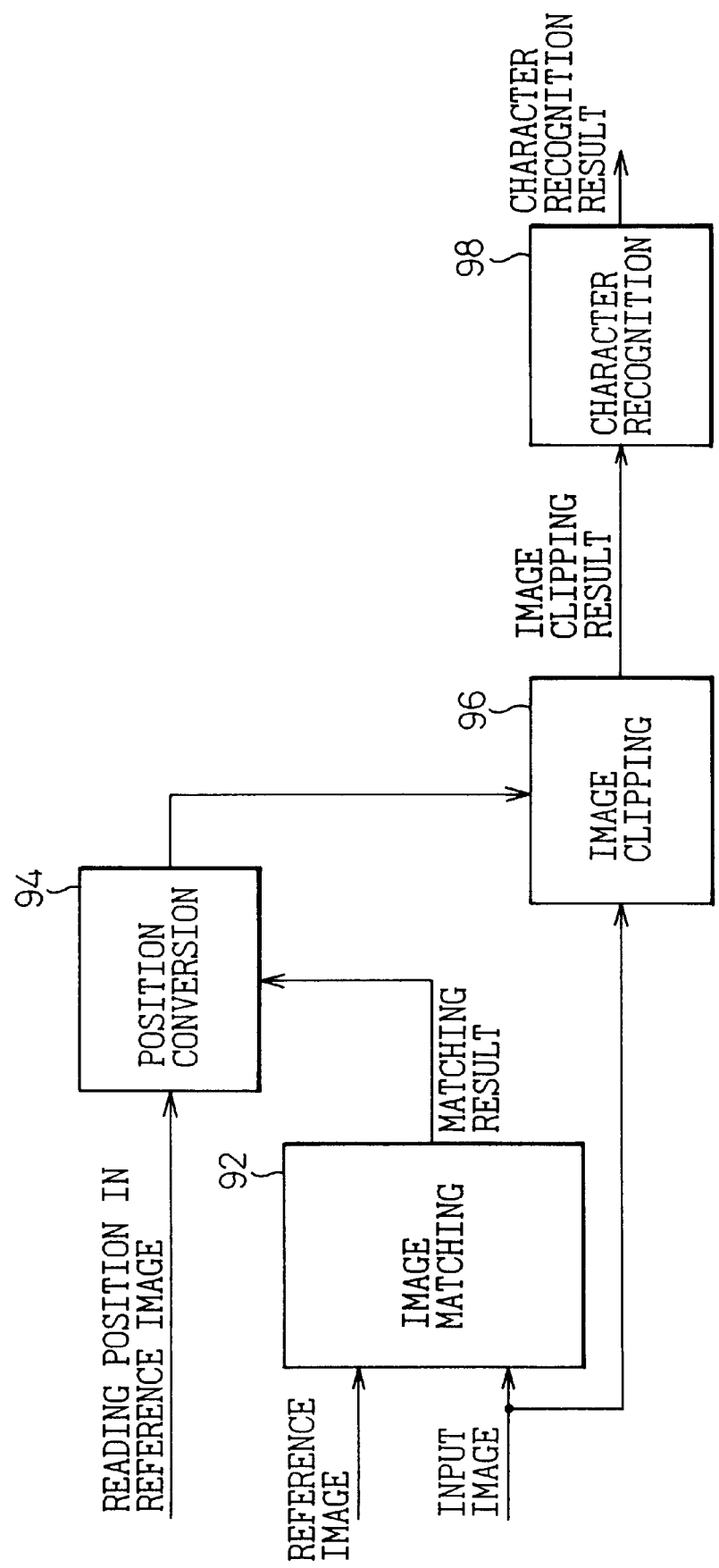
FIG. 39 is a functional block diagram of a character recognition apparatus according to another embodiment of the present invention.

FIG. 39 is a functional block diagram of a character recognition apparatus using the image matching method so far described. An image matching section 92 corresponds to the image matching apparatus so far described. A position converter 94, based on the matching result from the image matching section 92, converts a character reading position in the preset reference image into a character reading position in the input image. An image clipping section 96 clips an input character region from the input image in accordance with the character reading position output from the position converter 94. A character recognition section 98 recognizes characters from the input character image clipped out by the image clipping section 96.

Figure 40:
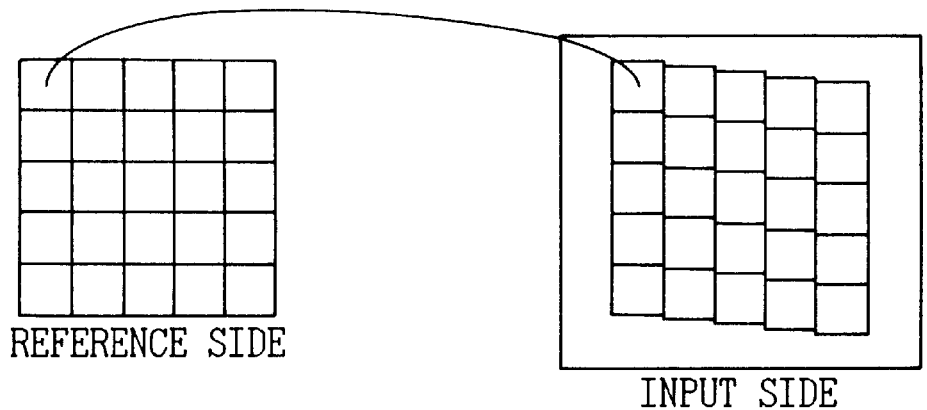
FIG. 40 is a diagram for explaining the operation of the apparatus of FIG. 39.
Figure 41:
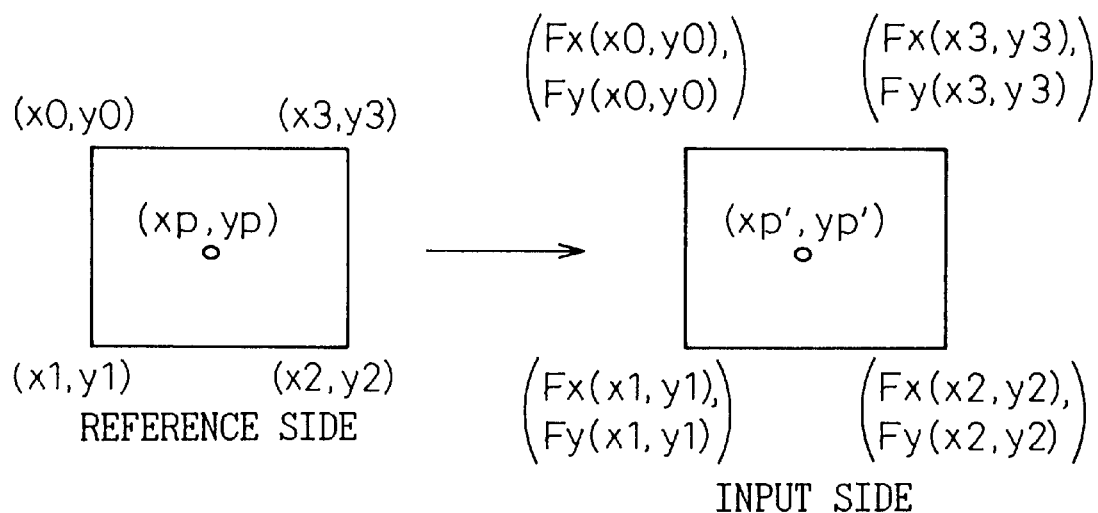
FIG. 41 is a diagram for explaining the operation of the apparatus of FIG. 39.

For each small block in the reference image, the corresponding coordinates in the input image can be obtained, as shown in FIG. 40, as the result of the matching performed by the image matching section 92. If the small-block size is 32×32 pixels, and the pixel density of the image is 400 dpi, for example, the coordinates in the reference image are obtained in increments of about 2 mm. From the result of the matching, for any coordinates in the reference image the corresponding coordinates in the input image can be obtained by linearly interpolating between the coordinates obtained in increments of 2 mm. For example, to convert coordinates (xp, yp) in a small block whose four corners are represented by coordinates (x0, y0), (x1, y1), (x2, y2), and (x3, y3), the following equations are used.

X coordinate after conversion xp'=Fx(x0, y0)+(Fx(x2, y2)−Fx(x0, y0))×(xp−x0)/(x2−x0)

Figure 42:
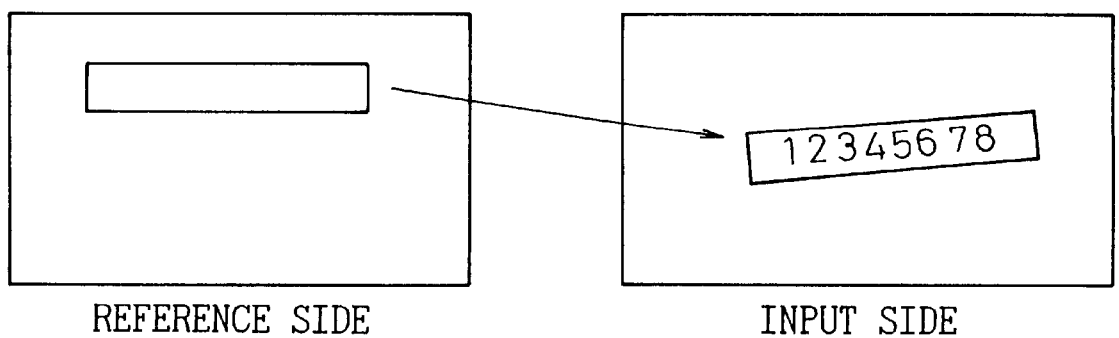
FIG. 42 is a diagram for explaining the operation of the apparatus of FIG. 39.
Figure 43:
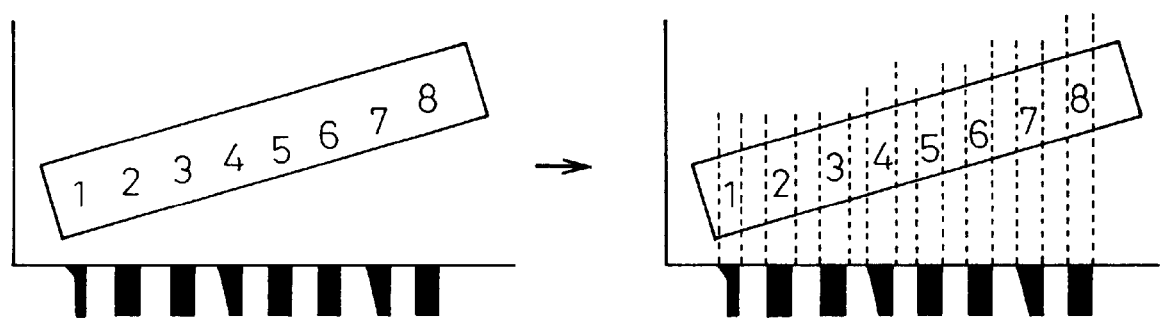
FIG. 43 is a diagram for explaining the operation of the apparatus of FIG. 39.

Y coordinate after conversion yp'=Fy(x0, y0)+(Fy(x2, y2)−Fy(x0, y0))×(yp−y0)/(y2−y0) where Fx(x, y) is the x coordinate and Fy(x, y) is the y coordinate when the coordinates (x, y) in the reference image are converted to the coordinates in the input image. Based on the above equations, the position converter 94 converts the character reading region as shown in FIG. 42, and the image clipping section 96 clips out the reading region from the input image and then clips out the image within the reading region one character at a time. The simplest way to accomplish this is to compute the distribution of black pixels by vertically projecting the black pixels in the reading region positioned as shown in FIG. 43, and to detect the positions where no black pixels exist (gaps between characters). When the image is skewed, the clipping accuracy can be improved by changing the direction of projection according to the amount of skew.

Finally, the image clipped out for each character is passed to the character recognition section 98, starting from the head of the character string, and the characters are thus recognized. The character codes of the filled-in characters can thus be obtained. The character recognition processing in the character recognition section 98 is well known to those skilled in the art and, therefore, a description thereof is omitted.

Figure 44:
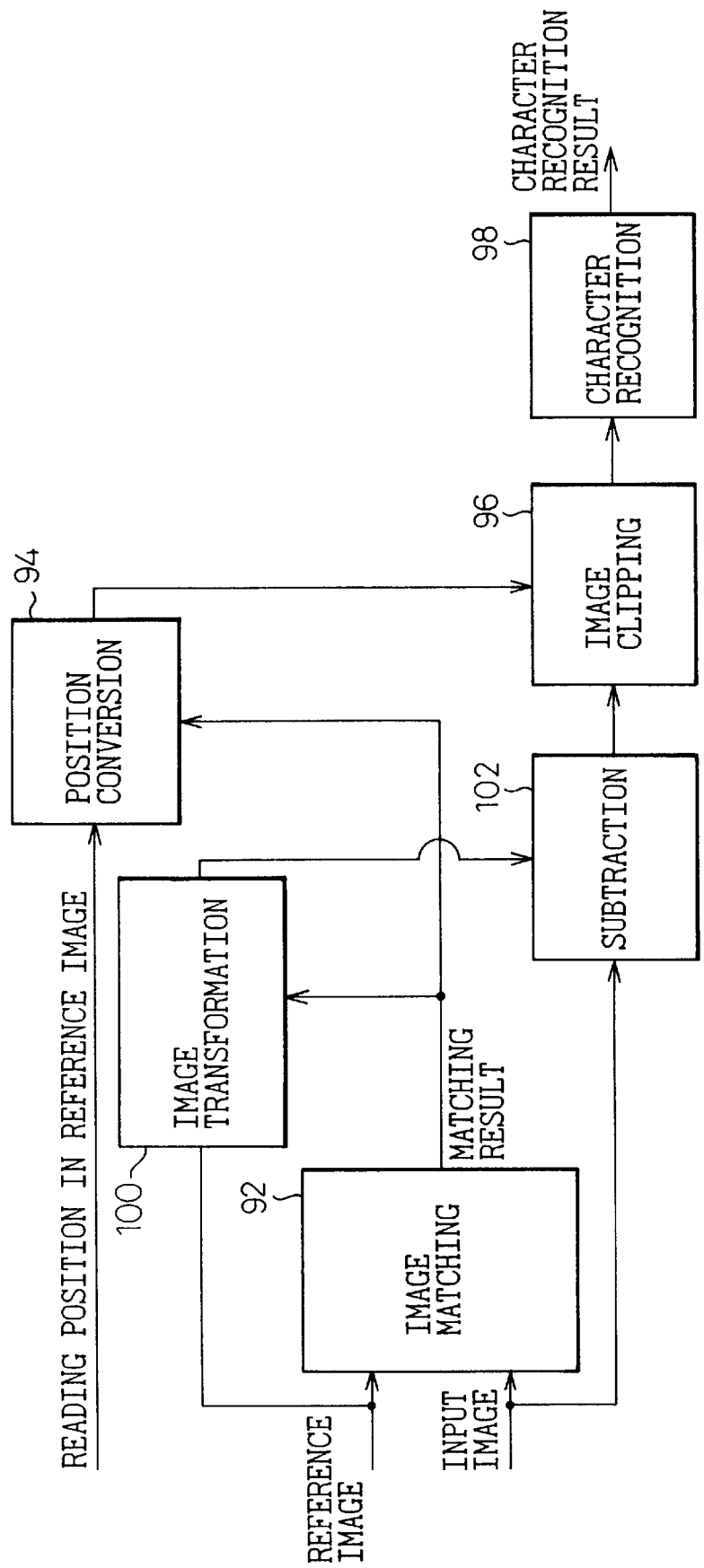
FIG. 44 is a functional block diagram of a character recognition apparatus according to still another embodiment of the present invention.

FIG. 44 is a functional block diagram of another example of the character recognition apparatus according to the present invention. The same constituent elements as those in FIG. 39 are designated by the same reference numerals, and explanatory descriptions of such elements are omitted. An image transforming section 100 transforms the reference image as shown in FIG. 45 on the basis of the matching result from the image matching section 92. In this case, images in the small blocks are scaled according to the distance between each small block. Since the small-block size is small, skew need not be considered, but a skew transformation may be applied according to the skew parameter θ of the medium block. A subtractor 102 superimposes the transformed reference image on the input image, and blanks out those regions where the pixels in the reference image match the pixels in the input image. By so doing, character entry frames, printed text, and other portions not needed for character recognition are erased from the input image, leaving only the filled-in characters, This image is passed to the image clipping section 96 where images are clipped out, after which character recognition is performed by the character recognition section 98.

Thus the character recognition apparatus of the present invention allows positioning of printed forms without relying on specific elements such as line segments and marks, and is capable of reading characters even when the input printed form has been subjected to positional displacement, stretching/shrinking, or rotation.

Furthermore, since printing existing in the reference image can be erased from the input image, character entry frames and other printed portions not needed for reading can be erased before reading characters. This offers the advantage of not relying on specific frame shapes.

Figure 46:
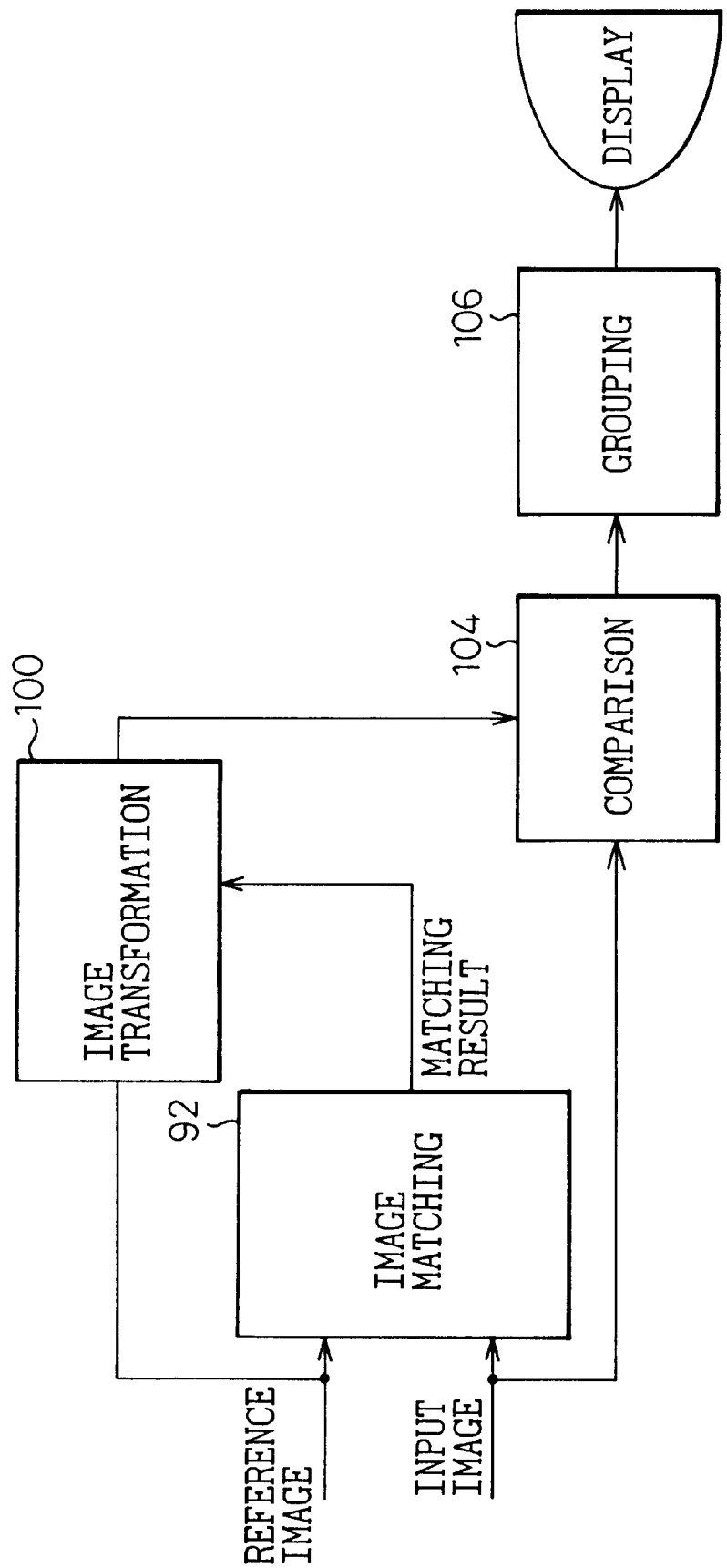
FIG. 46 is a functional block diagram of a mismatching portion detection apparatus according to yet another embodiment of the present invention.

FIG. 46 is a functional block diagram of a mismatching portion detection apparatus using the image matching method of the present invention. The same constituent elements as those in FIG. 44 are designated by the same reference numerals, and explanatory descriptions of such elements are omitted. A comparator 104 compares the reference image transformed by the image transforming section 100 with the input image by superimposing the former on the latter, and detects portions that do not match between the two images. A grouping section 106 groups together neighboring pixels from the mismatching pixels detected by the comparator 104, and outputs for display only such pixel groups that are larger than a prescribed area.

One way of grouping is, for example, by grouping together adjoining pixels as an isolated region, labeling the isolated region accordingly, and then combining together differently labeled regions whose contour-to-contour distances are below a threshold. Portions with area sizes larger than a threshold are superimposed on the input image to display mismatching potions.

The mismatching portion detection apparatus of the present invention is capable of showing mismatching portions by matching the input image against the reference image even when there is a positional displacement, stretching/shrinking, or rotation between the two images.

FIG. 47 is a functional block diagram of a printing apparatus using the image matching method of the present invention. The same constituent elements as those in FIG. 39 are designated by the same reference numerals. Reference numeral 20 is the one-dimensional CCD device already explained with reference to FIG. 2, and 21 is the printing unit. The image matching section 92, using the already described technique, performs matching between the prestored reference image and the input image obtained by the one-dimensional CCD device 20 from the form sheet or the like being transported. The position converter 94 converts a printing position in the prestored reference image into a position in the input image on the basis of the matching result from the image matching section 92. A printed image generator 108 generates a printed image in accordance with the received character codes and with the printing position supplied from the position converter 94, and directs the printing unit 21 to print the image. In this way, printing is performed on the form sheet or the like being transported.

The printing apparatus of the present invention eliminates the need to print marks on form sheets, and is capable of printing by precisely aligning positions even when preprinting on the form sheet is distorted.

In the image matching of the present invention, it is recommended to execute the following processings, but since these are apparent to those skilled in the art, a detailed explanation will not be given here.

1) To perform cleaning and filtering to eliminate noise before obtaining an edge image.
2) To extract regions where edges are unstable by extracting shades and tones, and exclude such regions from the regions to be examined for matching.
3) To reduce the amount of computation and improve accuracy by combining the method of the invention with the matching method that relies on line segments and registration marks.
4) To record history of matching operations to make it possible to backtrack and try again when a matching error is detected.
5) To exclude those portions that tend to be affected when density is low, by not obtaining edges in thin line portions when generating an edge image.
6) To detect straight lines from the reference image in advance and to link blurred line segments by broken line linking processing and write the results back to the image, thereby ensuring accurate matching where line segments are blurred.

In the present invention, edge images are obtained from the reference and input images, and the two images are matched by obtaining the frequencies of distances between the edges when they are superimposed one on top of another. Accordingly, matching can be done without relying on specific elements such as line segments and tables as in the prior art. Furthermore, in the present invention, the reference edge image is divided into small blocks, and these small blocks are sequentially applied to the input edge image for matching. In this method, since matching is done with the blocks displaced according to the degree of distortion of the input image, the stretching/shrinking, skewing, and local distortions of the input image can be absorbed.

Further, in the present invention, when obtaining the frequencies of distances between the edges in the reference and input images, a drastic reduction in the amount of computation can be achieved by obtaining the frequencies of distances only in the horizontal and vertical directions.

When an image is input, the input image may be incomplete or thin compared with the sample image because of differences in contrast setting and in properties of the object of interest, but by preparing four kinds of edge images, i.e., upper, lower, left, and right images, and by processing the left and right and the upper and lower edge images separately, correct matching can be achieved even when image thickness changes between the reference image and the input image because of differences in contrast setting at the time of input, etc.

If the frequencies of distances are obtained by approximating the edges composed of horizontal and vertical lines by intercept parameters, not only accurate matching can be achieved even when the horizontal and vertical edge portions are somewhat irregular in shape, but the time required for computation can be saved since the input images can be represented by intercept values alone. In this way, the accuracy of matching can be improved while reducing the amount of computation.

When performing computation for matching, if the input image is skewed relative to the reference image, correct matching may not be achieved; in the present invention, however, accurate matching can be done by estimating the skew value from the previous matching results, and by correcting the calculation of the frequencies of distances.

Furthermore, in the present invention, already matched reference blocks are grouped together in a medium block, and parameters representing the positional displacement, stretching/shrinking, and skewness of the medium block relative to the input image are calculated, based on which corresponding positions are estimated for the regions not yet matched. This makes it possible to perform matching when, for example, there is a large blank area within the image.

The character recognition apparatus constructed according to the present invention allows positioning of printed forms without relying on specific elements such as line segments and tables, and is capable of reading characters even if there is a positional displacement, stretching/shrinking, or rotation in the input form.

Moreover, since printing existing in the reference image can be erased from the input image, character entry frames and other printed portions not needed for reading can be erased before reading characters. This offers the advantage of not relying on specific frame shapes.

The mismatching portion detection apparatus constructed according to the present invention is capable of showing mismatching portions by matching the input image against the reference image even when there exists a positional displacement, stretching/shrinking, or rotation between the two images.

The printing apparatus constructed according to the present invention eliminates the need to print marks on printed forms, and is capable of printing by precisely aligning positions even when preprinting on the printed form is distorted.

As described above, according to the present invention, image matching can be achieved that does not depend on the layout, and yet the matching can be done in the presence of image stretching/shrinking, skew, and local distortions. Thus the invention greatly contributes to improving performance such as aligning of reading positions in an OCR apparatus, aligning of printing positions in a printing apparatus, and detection of mismatching portions between two images.

What is claimed is:

1. A method of matching an input image with a reference image by determining the positions of various portions in said input image corresponding to various portions of said reference image, comprising the steps of:

(a) dividing in advance said reference image into a plurality of small blocks;

(b) determining for each small block a search range over which the input image is to be searched for a portion corresponding thereto in said input image;

(c) storing said small blocks together with the search range for each small block; and (d) searching said input image within said search ranges for portions corresponding to said small blocks, to determine the positions, in said input image, of the portions corresponding to said small blocks, a search priority of each small block being determined based on a count of pixels of a specified type contained in the small block.

2. A method according to claim 1, further comprising the step of (e) correcting, during the execution of said step (d), the search priority and search ranges for small blocks whose corresponding positions in said input image have not yet been determined, on the basis of the corresponding positions in said input image for the small blocks for which such positions have already been determined.

3. A method according to claim 2 wherein, in said step (a), said reference image is divided into a plurality of medium blocks each consisting of a plurality of small blocks, and said step (e) includes the substeps of:

(i) calculating, for a medium block having more than a prescribed number of small blocks whose corresponding positions have already been determined, the values of transformation parameters for the entire medium block from the already determined corresponding positions of the small blocks in said medium block;

(ii) determining from said calculated values of transformation parameters the search range for each of the small blocks in said medium block whose corresponding positions have not yet been determined;

(iii) estimating from the values of transformation parameters calculated in said substep (i) the values of transformation parameters for a medium block not having more than the prescribed number of small blocks whose corresponding positions have already been determined; and (iv) determining from said estimated values of transformation parameters the search range for each of the small blocks in said medium block that does not have more than the prescribed number of small blocks whose corresponding positions have already been determined.

4. A method according to claim 1, wherein in said step (d), the degree of skewness of said input image relative to said reference image is estimated on the basis of the small blocks whose corresponding positions have already been determined, and the determination of the positions, in said input image, of the portions corresponding to said small blocks is corrected on the basis of the value of said estimated degree of skewness.

5. A method of matching an input image with a reference image by determining the positions of various portions in said input image corresponding to various portions of said reference image, comprising the steps of:

(a) dividing in advance said reference image into a plurality of small blocks;

(b) determining for each small block a search range over which the input image is to be searched for a portion corresponding thereto in said input image;

(c) storing said small blocks together with the search range for each small block; and (d) searching said input image within said search ranges for portions corresponding to said small blocks, to determine the positions, in said input image, of the portions corresponding to said small blocks, wherein said step (d) includes the substeps of:

(i) generating in advance a reference edge image by extracting an edge of said reference image, (ii) generating an input edge image by extracting an edge of said input image, (iii) calculating the frequency of a distance between each of the pixels forming the edge of said input edge image and each of the pixels forming the edge of said reference edge image when said reference edge image is superimposed at an estimated corresponding position of said input edge image, and (iv) determining the corresponding position by determining the distance whose calculated frequency exceeds a prescribed threshold as the distance between said input image and said reference image.

6. A method according to claim 5, wherein:

said substep (i) includes the substep of generating a reference upper edge image, a reference lower edge image, a reference left edge image, and a reference right edge image by extracting upper, lower, left, and right edges, respectively, in said reference image;

said substep (ii) includes the substep of generating an input upper edge image, an input lower edge image, an input left edge image, and an input right edge image by extracting upper, lower, left, and right edges, respectively, in said input image;

said substep (iii) includes the substep of calculating the frequencies of distances in vertical direction between each of the pixels forming said input upper and lower edge images and each of the pixels forming said reference upper and lower edge images, respectively, and of distances in horizontal direction between each of the pixels forming said input left and right edge images and each of the pixels forming said reference left and right edge images, respectively, when said input upper edge image, said input lower edge image, said input left edge image, and said input right edge image are superimposed on said reference upper edge image, said reference lower edge image, said reference left edge image, and said reference right edge image, respectively; and said substep (iv) includes the substeps of:
  determining the distances whose frequency calculated for the upper and lower edges exceeds a prescribed threshold and matches within prescribed error limits between the two distances as the distance between said input image and said reference image in the vertical direction, and
  determining the distances whose frequency calculated for the left and right edges exceeds a prescribed threshold and matches within prescribed error limits between the two distances as the distance between said input image and said reference image in the horizontal direction.

7. A method according to claim 5, wherein said step (d) further includes the substeps of:
  (v) detecting straight edge line running in one of a vertical direction and a horizontal direction in said reference image, and
  (vi) when the edge extracted in substep (i) corresponds to the straight edge line detected in said substep (v), replacing a position of the edge in said reference edge image by an intercept value of said straight edge line before performing said substep (iii).

8. A method for recognizing filled-in characters from an input image generated from a form sheet filled out with characters, comprising the steps of:
  (a) dividing in advance a reference image generated from a blank form sheet into a plurality of small blocks;
  (b) determining for each small block a search range over which the input image is to be searched for a portion corresponding thereto in said input image;
  (c) storing said small blocks together with the search range for each small block;
  (d) searching said input image within said search ranges for portions corresponding to said small blocks, to determine the positions, in said input image, of the portions corresponding to said small blocks a search priority of each small block being determined based on a count of pixels of a specified type contained in the small block;
  (e) determining a character entry region in said input image corresponding to a prestored entry region on the basis of the corresponding positions determined in said step (d); and
  (f) recognizing a character from an image within the character entry region determined in said step (e) in said input image.

9. A method for recognizing filled-in characters from an input image generated from a form sheet filled out with characters, comprising the steps of:
  (a) dividing in advance a reference image generated from a blank form sheet into a plurality of small blocks;
  (b) determining for each small block a search range over which the input image is to be searched for a portion corresponding thereto in said input image;
  (c) storing said small blocks together with the search range for each small block;
  (d) searching said input image within said search ranges for portions corresponding to said small blocks, to determine the positions, in said input image, of the portions corresponding to said small blocks, a search priority of each small block being determined based on a count of pixels of a specified type contained in the small block;
  (e) stripping said input image of portions corresponding to said reference image on the basis of the corresponding position determined for each small block; and
  (f) recognizing characters from said input image that has been stripped of portions corresponding to said reference image in said step (e).

10. A method for detecting a mismatching portion between a first image and a second image, comprising the steps of:
  (a) dividing in advance said first image into a plurality of small blocks;
  (b) determining for each small block a search range over which the second image is to be searched for a portion corresponding thereto in said second image;
  (c) storing said small blocks together with the search range for each small block;
  (d) searching said second image within said search ranges for portions corresponding to said small blocks, to determine the positions, in said second image, of the portions corresponding to said small blocks, a search priority of each small block being based on a count of pixels of a specified type contained in the small block;
  (e) stripping said second image of portions corresponding to said first image on the basis of the corresponding position determined for each small block;
  (f) grouping pixels remaining in said second image that has been stripped of said portions corresponding to first image in said step (e); and
  (g) determining a pixel group as representing a mismatching portion if the number of pixels arranged in said step (f) as belonging to said group exceeds a prescribed value.

11. A method for printing characters on a form sheet, comprising the steps of:
  (a) dividing in advance a reference image generated from a reference form sheet into a plurality of small blocks;
  (b) determining for each small block a search range over which an input image is to be searched for a portion corresponding thereto in the input image generated from a form sheet to be printed with characters;
  (c) storing said small blocks together with the search range for each small block;
  (d) searching said input image within said search ranges for portions corresponding to said small blocks, to determine the positions, in said input image, of the portions corresponding to said small blocks, a search priority of each small block being determined based on a count of pixels of a specified type contained in the small block;

(e) determining a printing position in said input image corresponding to a prestored printing position on the basis of the corresponding positions determined in said step (d); and (f) printing characters on the form sheet to be printed with characters, in accordance with the printing position determined in said step (e).

12. An apparatus for matching an input image with a reference image by determining the positions of various portions in said input image corresponding to various portions of said reference image, comprising:

search range determining means for determining, for each of a plurality of small blocks into which said reference image is divided, a search range over which the input image is to be searched for a portion corresponding thereto in said input image;

storage means for storing said small blocks together with the search range for each small block; and searching means for searching said input image within said search ranges for portions corresponding to said small blocks, to determine the positions, in said input image, of the portions corresponding to said small blocks, wherein said searching means determines a search priority of each small block based on a count of pixels of a specified type contained in the small block.

13. An apparatus according to claim 12, further comprising correcting means for correcting, during the execution of searching by said searching means, the search priority and search ranges for small blocks whose corresponding positions in said input image have not yet been determined, on the basis of the corresponding positions in said input image for the small blocks for which such positions have already been determined.

14. An apparatus according to claim 13, wherein said reference image is divided into a plurality of medium blocks each consisting of a plurality of small blocks, and said correcting means includes:

means for calculating, for a medium block having more than a prescribed number of small blocks whose corresponding positions have already been determined, the values of transformation parameters for the entire medium block from the already determined corresponding positions of the small blocks in said medium block;

means for determining from said calculated values of transformation parameters the search range for each of the small blocks in said medium block whose corresponding positions have not yet been determined;

means for estimating from said calculated values of transformation parameters the values of transformation parameters for a medium block not having more than the prescribed number of small blocks whose corresponding positions have already been determined; and means for determining from said estimated values of transformation parameters the search range for each of the small blocks in said medium block that does not have more than the prescribed number of small blocks whose corresponding positions have not yet been determined.

15. An apparatus according to claim 12, wherein said searching means estimates the degree of skewness of said input image relative to said reference image on the basis of the small blocks whose corresponding positions have already been determined and, on the basis of the value of said estimated degree of skewness, corrects the determination of the positions, in said input image, of the portion corresponding to said small blocks.

16. An apparatus for matching an input image with a reference image by determining the positions of various portions in said input image corresponding to various portions of said reference image, comprising:

search range determining means for determining for each of a plurality of small blocks into which said reference image is divided, a search range over which the input image is to be searched for a portion corresponding thereto in said input image;

storage means for storing said small blocks together with the search range for each small block; and searching means for searching said input image within said search ranges for portions corresponding to said small blocks, to determine the positions, in said input image, of the portions corresponding to said small blocks, wherein said searching means includes:

reference edge image generating means for generating in advance a reference edge image by extracting an edge of said reference image, input edge image generating means for generating an input edge image by extracting an edge of said input image, frequency calculating means for calculating the frequency of a distance between each of the pixels forming the edge of said input edge image and each of the pixels forming the edge of said reference edge image when said reference edge image is superimposed at an estimated corresponding position of said input edge image, and distance determining means for determining the corresponding position by determining the distance whose calculated frequency exceeds a prescribed threshold as the distance between said input image and said reference image.

17. An apparatus according to claim 15, wherein said reference edge image generating means includes means for generating a reference upper edge image, a reference lower edge image, a reference left edge image, and a reference right edge image by extracting upper, lower, left, and right edges, respectively, in said reference image, said input edge image generating means includes means for generating an input upper edge image, an input lower edge image, an input left edge image, and an input right edge image by extracting upper, lower, left, and right edges, respectively, in said input image, said frequency calculating means includes means for calculating the frequencies of distances in vertical direction between each of the pixels forming said input upper and lower edge images and each of the pixels forming said reference upper and lower edge images, respectively, and of distances in the horizontal direction between each of the pixels forming said input left and right edge images and each of the pixels forming said reference left and right edge images, respectively, when said input upper edge image, said input lower edge image, said input left edge image, and said input right edge image are superimposed on said reference upper edge image, said reference lower edge image, said reference left edge image, and said reference right edge image, respectively, and said distance determining means includes means for determining the distances whose frequency calculated for the upper and lower edges exceeds a prescribed threshold and matches within prescribed error limits between the two distances as the distance between said input image and said reference image in the vertical direction, and means for determining the distances whose frequency calculated for the left and right edges exceeds a prescribed threshold and matches within prescribed error limits between the two distances as the distance between said input image and said reference image in the horizontal direction.

18. An apparatus according to claim 16, wherein said searching further includes:

means for detecting a straight edge line running in one of a vertical direction and a horizontal direction in said reference image; and means for replacing a position of said extracted edge in said reference edge image by an intercept value of said detected straight edge line before the frequency calculation by said frequency calculating means, when said extracted edge corresponds to said detected straight edge line.

19. An apparatus for recognizing filled-in characters from an input image generated from a form sheet filled out with characters, comprising:

dividing means for dividing in advance a reference image generated from a blank form sheet into a plurality of small blocks;

search range determining means for determining for each small block a search range over which the input image is to be searched for a portion corresponding thereto in said input image;

storage means for storing said small blocks together with the search range for each small block;

searching means for searching said input image within said search ranges for portions corresponding to said small blocks, to determine the positions, in said input image, of the portions corresponding to said small blocks wherein said searching means determines a search priority of each small block on a count of pixels of a specified type contained in the small block;

entry region determining means for determining a character entry region in said input image corresponding to a prestored entry region on the basis of the corresponding positions determined by said searching means; and means for recognizing a character from an image within the character entry region determined by said entry region determining means in said input image.

20. An apparatus for recognizing filled-in characters from an input image generated from a form sheet filled out with characters, comprising:

dividing means for dividing in advance a reference image generated from a blank form sheet into a plurality of small blocks;

search range determining means for determining for each small block a search range over which the input image is to be searched for a portion corresponding thereto in said input image;

storage means for storing small blocks together with the search range for each small block;

searching means for searching said input image within said search ranges for portions corresponding to said small blocks, to determine the positions, in said input image, of the portions corresponding to said small blocks wherein said searching means determines a search priority of each small block on a count of pixels of a specified type contained in the small block and useful for performing the matching;

means for stripping said input image of portions corresponding to said reference image on the basis of the corresponding position determined for each small block; and means for recognizing characters from said input image that has been stripped of portions corresponding to said reference image.

21. An apparatus for detecting a mismatching portion between a first image and a second image, comprising:

search range determining means for determining, for each of a plurality of small blocks into which said first image is divided, a search range over which the second image is to be searched for a portion corresponding thereto in said second image;

storage means for storing said small blocks together with the search range for each small block;

searching means for searching said second image within said search ranges for portions corresponding to said small blocks, to determine the positions, in said second image, of the portions corresponding to said small blocks wherein said searching means determines a search priority of each small block on a count of pixels of a specified type contained in the small block;

means for stripping said second image of portions corresponding to said first image on the basis of the corresponding position determined for each small block;

means for grouping pixels remaining in said second image that has been stripped of said portions corresponding to first image; and means for determining a pixel group as representing a mismatching portion if the number of pixels arranged as belonging to said group exceeds a prescribed value.

22. An apparatus for printing characters on a form sheet, comprising:

dividing means for dividing in advance a reference image generated from a reference form sheet into a plurality of small blocks;

search range determining means for determining for each small block a search range over which an input image is to be searched for a portion corresponding thereto in the input image generated from a form sheet to be printed with characters;

storage means for storing small blocks together with the search range for each small block;

searching means for searching said input image within said search ranges for portions corresponding to said small blocks, to determine the positions, in said input image, of the portions corresponding to said small blocks wherein said searching means determines a search priority of each small block on a count of pixels of a specified type contained in the small block;

printing position determining means for determining a printing position in said input image corresponding to a prestored printing position on the basis of the corresponding positions determined by searching means; and means for printing characters on the form sheet to be printed with characters, in accordance with the printing position determined by said printing position determining means.

23. A program storage device readable by a machine, tangibly embodying a program of instructions executable by the machine to perform method steps for matching an input image with a reference image by determining the positions of various portions in said input image corresponding to various portions of said reference image, said method steps comprising:

(a) dividing in advance said reference image into a plurality of small blocks;

(b) determining for each small block a search range over which the input image is to be searched for a portion corresponding thereto in said input image;

(c) storing said small blocks together with the search range for each small block; and (d) searching said input image within said search ranges for portions corresponding to said small blocks, to determine the positions, in said input image, of the portions corresponding to said small blocks, a search priority of each small block being determined based on a count of pixels of a specified type contained in the small block.

24. A program storage device according to claim 23, further comprising the step of (e) correcting, during the execution of said step (d), the search priority and search ranges for small blocks whose corresponding positions in said input image have not yet been determined, on the basis of the corresponding positions in said input image for the small blocks for which such positions have already been determined.

25. A program storage device according to claim 24, wherein in said step (a), said reference image is divided into a plurality of medium blocks each consisting of a plurality of small blocks, and said step (e) includes the substeps of:

(i) calculating, for a medium block having more than a prescribed number of small blocks whose corresponding positions have already been determined, the values of transformation parameters for the entire medium block from the already determined corresponding positions of the small blocks in said medium block;

(ii) determining from said calculated values of transformation parameters the search range for each of the small blocks in said medium block whose corresponding positions have not yet been determined;

(iii) estimating from the values of transformation parameters calculated in said substep (i) the values of transformation parameters for a medium block not having more than the prescribed number of small blocks whose corresponding positions have already been determined; and (iv) determining from said estimated values of transformation parameters the search range for each of the small blocks in said medium block that does not have more than the prescribed number of small blocks whose corresponding positions have already been determined.

26. A program storage device according to claim 23, wherein in said step (d), the degree of skewness of said input image relative to said reference image is estimated on the basis of the small blocks whose corresponding positions have already been determined, and the determination of the positions in said input image, of the portions corresponding to said small blocks is corrected on the basis of the value of said estimated degree of skewness.

27. A program storage device according to claim 23, wherein said step (d) includes the substeps of:

(i) generating in advance a reference edge image by extracting an edge of said reference image;

(ii) generating an input edge image by extracting an edge of said input image;

(iii) calculating the frequency of a distance between each of the pixels forming the edge of said input edge image and each of the pixels forming the edge of said reference edge image when said reference edge image is superimposed at an estimated corresponding position of said input edge image; and (iv) determining the corresponding position by determining the distance whose calculated frequency exceeds a prescribed threshold as the distance between said input image and said reference image.

28. A program storage device according to claim 27, wherein said substep (i) includes the substep of generating a reference upper edge image, a reference lower edge image, a reference left edge image, and a reference right edge image by extracting upper, lower, left, and right edges, respectively, in said reference image, said substep (ii) includes the substep of generating an input upper edge image, an input lower edge image, an input left edge image, and an input right edge image by extracting upper, lower, left, and right edges, respectively, in said input image, said substep (iii) includes the substep of calculating the frequencies of distances in vertical direction between each of the pixels forming said input upper and lower edge images and each of the pixels forming said reference upper and lower edge images, respectively, and of distances in horizontal direction between each of the pixels forming said input left and right edge images and each of the pixels forming said reference left and right edge images, respectively, when said input upper edge image, said input lower edge image, said input left edge image, and said input right edge image are superimposed on said reference upper edge image, said reference lower edge image, said reference left edge image, and said reference right edge image, respectively, and said substep (iv) includes the substeps of determining the distances whose frequency calculated for the upper and lower edges exceeds a prescribed threshold and matches within prescribed error limits between the two distances as the distance between said input image and said reference image in the vertical direction, and determining the distances whose frequency calculated for the left and right edges exceeds a prescribed threshold and matches within prescribed error limits between the two images as representing the distance between said input image and said reference image in the horizontal direction.

29. A program storage device according to claim 27, wherein said step (d) further includes the substeps of:

(v) detecting straight edge line running in one of a vertical direction and a horizontal direction in said reference image; and (vi) when the edge extracted in substep (i) corresponds to the straight edge line detected in said substep (v), replacing a position of the edge in said reference edge image by an intercept value of said straight edge line before performing said substep (iii).

30. A program storage device readable by a machine, tangibly embodying a program of instructions executable by the machine to perform method steps for recognizing filled-in characters from an input image generated from a form sheet filled out with characters, said method steps comprising:

(a) dividing in advance a reference image generated from a blank form sheet into a plurality of small blocks;

(b) determining for each small block a search range over which the input image is to be searched for a portion corresponding thereto in said input image;

(c) storing said small blocks together with the search range for each small block;

(d) searching said input image within said search ranges for portions corresponding to said small blocks, to determine the positions, in said input image, of the portions corresponding to said small blocks a search priority of each small block being determined based on a count of pixels of a specified type contained in the small block;

(e) determining a character entry region in said input image corresponding to a prestored entry region on the basis of the corresponding positions determined in said step (d); and (f) recognizing a character from an image within the character entry region determined in said step (e) in said input image.

31. A program storage device readable by a machine, tangibly embodying a program of instructions executable by the machine to perform method steps for recognizing filled-in characters from an input image generated from a form sheet filled out with characters, said method steps comprising:

(a) dividing in advance a reference image generated from a blank form sheet into a plurality of small blocks;

(b) determining for each small block a search range over which the input image is to be searched for a portion corresponding thereto in said input image;

(c) storing said small blocks together with the search range for each small block;

(d) searching said input image within said search ranges for portions corresponding to said small blocks, to determine the positions, in said input image, of the portions corresponding to said small blocks a search priority of each small block being determined of pixels of a specified type contained in the small block;

(e) stripping said input image of portions corresponding to said reference image on the basis of the corresponding position determined for each small block; and (f) recognizing characters from said input image that has been stripped of portions corresponding to said reference image in said step (e).

32. A program storage device readable by a machine, tangibly embodying a program of instructions executable by the machine to perform method steps for detecting a mismatching portion between a first image and a second image, said method steps comprising:

(a) dividing in advance said first image into a plurality of small blocks;

(b) determining for each small block a search range over which the second image is to be searched for a portion corresponding thereto in said second image;

(c) storing said small blocks together with the search range for each small block;

(d) searching said second image within said search ranges for portions corresponding to said small blocks, to determine the positions, in said second image, of the portions corresponding to said small blocks a search priority of each small block being determined based on a count of pixels of a specified type contained in the small block;

(e) stripping said second image of portions corresponding to said first image on the basis of the corresponding position determined for each small block;

(f) grouping pixels remaining in said second image that has been stripped of said portions corresponding to first image in said step (e); and (g) determining a pixel group as representing a mismatching portion if the number of pixels arranged in said step (f) as belonging to said group exceeds a prescribed value.

33. A program storage device readable by a machine, tangibly embodying a program of instructions executable by the machine to perform method steps for printing characters on a form sheet, said method steps comprising:

(a) dividing in advance a reference image generated from a reference form sheet into a plurality of small blocks;

(b) determining for each small block a search range over which an input image is to be searched for a portion corresponding thereto in the input image generated from a form sheet to be printed with characters;

(c) storing said small blocks together with the search range for each small block;

(d) searching said input image within said search ranges for portions corresponding to said small blocks to determine the positions, in said input image, of the portions corresponding to said small blocks a search priority of each small block being determined based on a count of pixels of a specified type contained in the small block;

(e) determining a printing position in said input image corresponding to a prestored printing position on the basis of the corresponding positions determined in said step (d); and (f) printing characters on the form sheet to be printed with characters, in accordance with the printing position determined in said step (e).

* * * * *

UNITED STATES PATENT AND TRADEMARK OFFICE
CERTIFICATE OF CORRECTION

PATENT NO.:   6,111,984
DATED     :   August 29, 2000
INVENTOR(S):  Yoshio FUKASAWA It is certified that error appears in the above-identified patent and that said Letters Patent is hereby corrected as shown below:

Col. 24,    line 8, after "determining" insert --,--;
line 29, change "15" to --16--.

Signed and Sealed this

Eighth Day of May, 2001

Attest:

NICHOLAS P. GODICI

*Attesting Officer*     Acting Director of the United States Patent and Trademark Office